United States Patent
Shinohara et al.

(10) Patent No.: US 9,383,553 B2
(45) Date of Patent: Jul. 5, 2016

(54) IMAGING LENS AND IMAGING APPARATUS EQUIPPED WITH THE IMAGING LENS

(71) Applicant: FUJIFILM Corporation, Tokyo (JP)

(72) Inventors: Yoshikazu Shinohara, Saitama-ken (JP); Yoshiaki Ishii, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/322,504

(22) Filed: Jul. 2, 2014

(65) Prior Publication Data
US 2015/0009578 A1  Jan. 8, 2015

(30) Foreign Application Priority Data

Jul. 2, 2013 (JP) .................................. 2013-138595
Jan. 24, 2014 (JP) .................................. 2014-011158

(51) Int. Cl.
*G02B 9/64* (2006.01)
*G02B 13/00* (2006.01)

(52) U.S. Cl.
CPC .............. *G02B 13/0045* (2013.01); *G02B 9/64* (2013.01)

(58) Field of Classification Search
CPC .............. G02B 3/02; G02B 3/04; G02B 9/64; G02B 13/0045; G02B 13/18; G02B 9/00

USPC .......... 348/335–369, 240.99–240.3; 359/708, 359/755, 754, 745
See application file for complete search history.

(56) References Cited

U.S. PATENT DOCUMENTS

| 5,675,440 A | 10/1997 | Kanamori |
| 2012/0075729 A1 | 3/2012 | Uemura |
| 2015/0103414 A1* | 4/2015 | Baik ............................ 359/708 |

FOREIGN PATENT DOCUMENTS

| JP | 07-281089 | 10/1995 |
| JP | 2012-068448 | 4/2012 |

* cited by examiner

*Primary Examiner* — Ricky Mack
*Assistant Examiner* — Gary O'Neill
(74) *Attorney, Agent, or Firm* — Young & Thompson

(57) ABSTRACT

An imaging lens substantially includes seven lenses, constituted by: a first lens having a positive refractive power and a convex surface toward an image side; a second lens having a negative refractive power; a third lens having a positive refractive power; a fourth lens; a fifth lens having a positive refractive power; a sixth lens; and a seventh lens having a negative refractive power, a concave surface toward an image side, and at least one inflection point in the surface toward the image side; provided in this order from an object side. All of the first lens through the seventh lens are single lenses.

20 Claims, 14 Drawing Sheets

EXAMPLE 1

EXAMPLE 4

EXAMPLE 6

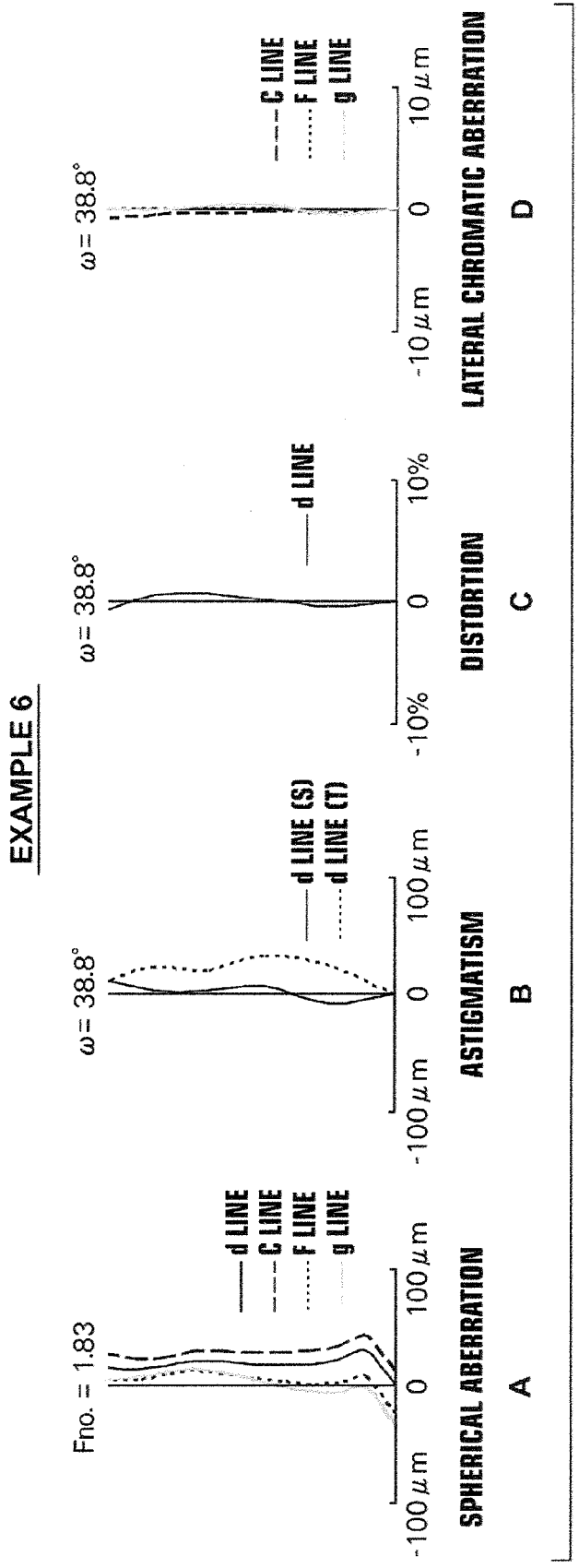

IMAGING LENS AND IMAGING APPARATUS EQUIPPED WITH THE IMAGING LENS

CROSS REFERENCE TO RELATED APPLICATIONS

The present application claims priority under 35 USC §119 to Japanese Patent Application No. 2013-138595 filed on Jul. 2, 2013 and Japanese Patent Application No. 2014-011158 filed on Jan. 24, 2014. Each of the above applications is hereby expressly incorporated by reference, in its entirety, into the present application.

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, and a portable gaming device.

BACKGROUND ART

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed. Further, imaging lenses having a lens configurations having six or more lenses, which is an even greater number of lenses, have been proposed to further improve performance. For example, Japanese Unexamined Patent Publication Nos. 7 (1995)-281089 and 2012-068448 disclose imaging lenses having seven lens configurations.

DISCLOSURE OF THE INVENTION

Meanwhile, the pixel sizes of imaging elements are becoming smaller accompanying the increase in the numbers of pixels therein, with respect to imaging lenses having comparatively short total lengths, which are employed particularly in portable terminals, smart phones, and tablet terminals. For this reason, there is demand for an imaging lens having a small F number having high performance and which is compatible with a compact imaging element to be realized.

The imaging lens disclosed in Japanese Unexamined Patent Publication No. 7 (1995)-281089 has a large F number, and it is difficult for this imaging lens to be applied to a compact imaging element capable of realizing a required degree of high resolution in order to meet this demand. In addition, it is desired for the total length of the imaging lens disclosed in Japanese Unexamined Patent Publication No. 2012-068448 to be shorter.

The present invention has been developed in view of the foregoing points. The object of the present invention is to provide an imaging lens with a small F number that can realize high imaging performance from a central angle of view through peripheral angles of view while having a short total length. It is another object of the present invention to provide an imaging apparatus equipped with the lens, which is capable of obtaining high resolution photographed images.

An imaging lens of the present invention substantially consists of seven lenses, including:

a first lens having a positive refractive power and a convex surface toward an object side;

a second lens having a negative refractive power;

a third lens having a positive refractive;

a fourth lens;

a fifth lens having a positive refractive power;

a sixth lens; and a seventh lens having a negative refractive power, a concave surface toward an image side, and at least one inflection point on the surface toward the image side; provided in this order from the object side;

all of the first lens through seventh lenses being single lenses.

Note that in the imaging lens of the present invention, the expression "substantially consists of seven lenses" means that the imaging lens of the present invention may also include lenses that practically have no power, optical elements other than lenses such as an aperture stop and a cover glass, and mechanical components such as lens flanges, a lens barrel, an imaging element, a camera shake correcting mechanism, etc., in addition to the seven lenses. In addition, the shapes of the surfaces of the lenses and the signs of the refractive indices thereof are considered in the paraxial region in the case that the lenses include aspherical surfaces.

The optical performance of the imaging lens of the present invention can be further improved by adopting the following favorable configurations.

In addition, it is preferable for the imaging lens of the present invention to further be equipped with an aperture stop, provided between the first lens and the second lens or between the second lens and the third lens.

It is preferable for the imaging lens of the present invention to satisfy one of Conditional Formulae (1) through (8-1) below. Note that a preferred aspect of the first imaging lens of the present invention may satisfy any one of Conditional Formulae (1) through (8-1), or may satisfy arbitrary combinations of Conditional Formulae (1) through (8-1).

$$0 < f/f12 \tag{1}$$

$$0 < f/f12 < 5 \tag{1-1}$$

$$0.2 < f/f12 < 1 \tag{1-2}$$

$$f/f2 < -0.1 \tag{2}$$

$$-1 < f/f2 < -0.2 \tag{2-1}$$

$$0 < f/f1 < 2.5 \tag{3}$$

$$0.5 < f/f1 < 2 \tag{3-1}$$

$$0 < f/f3 \tag{4}$$

$$0.32 < f/f3 < 1 \tag{4-1}$$

$$f/f4<0 \tag{5}$$

$$-0.65<f/f4<0 \tag{5-1}$$

$$0.08<Da/f \tag{6}$$

$$0.1<Da/f<0.3 \tag{6-1}$$

$$0.05<Db/f<0.3 \tag{7}$$

$$0.06<Db/f<0.2 \tag{7-1}$$

$$0.2<Dc/f<0.5 \tag{8}$$

$$0.21<Dc/f<0.4 \tag{8-1}$$

wherein f is the focal length of the entire system, f1 is the focal length of the first lens, f2 is the focal length of the second lens, f3 is the focal length of the third lens, f4 is the focal length of the fourth lens, f12 is the combined focal length of the first lens and the second lens, Da is the thickness of the first lens on the optical axis, Db is the thickness of the second lens on the optical axis, and Dc is the distance from the surface of the first lens toward the object side to the surface of the second lens toward the image side along the optical axis.

An imaging apparatus of the present invention is equipped with the imaging lens of the present invention.

The imaging lens of the present invention optimizes the configuration of each lens element within a lens configuration having seven lenses as a whole, and all of the lenses are single lenses. Therefore, a lens system having a short total length, a small F number, and high imaging performance from the central angle of view to peripheral angles of view can be realized.

In addition, the imaging apparatus of the present invention outputs image signals corresponding to optical images formed by an imaging lens of the present invention, which has high imaging performance. Therefore, the imaging apparatus of the present invention is capable of obtaining high resolution photographed images.

BRIEF DESCRIPTION OF THE DRAWINGS

FIG. 15 is a collection of diagrams that illustrate aberrations of the imaging lens of Example 6, wherein A illustrates spherical aberration, B illustrates astigmatic aberration (field curvature), C illustrates distortion, and D illustrates lateral chromatic aberration.

BEST MODE FOR CARRYING OUT THE INVENTION

Hereinafter, embodiments of the present invention will be described in detail with reference to the attached drawings.

Figure 1:
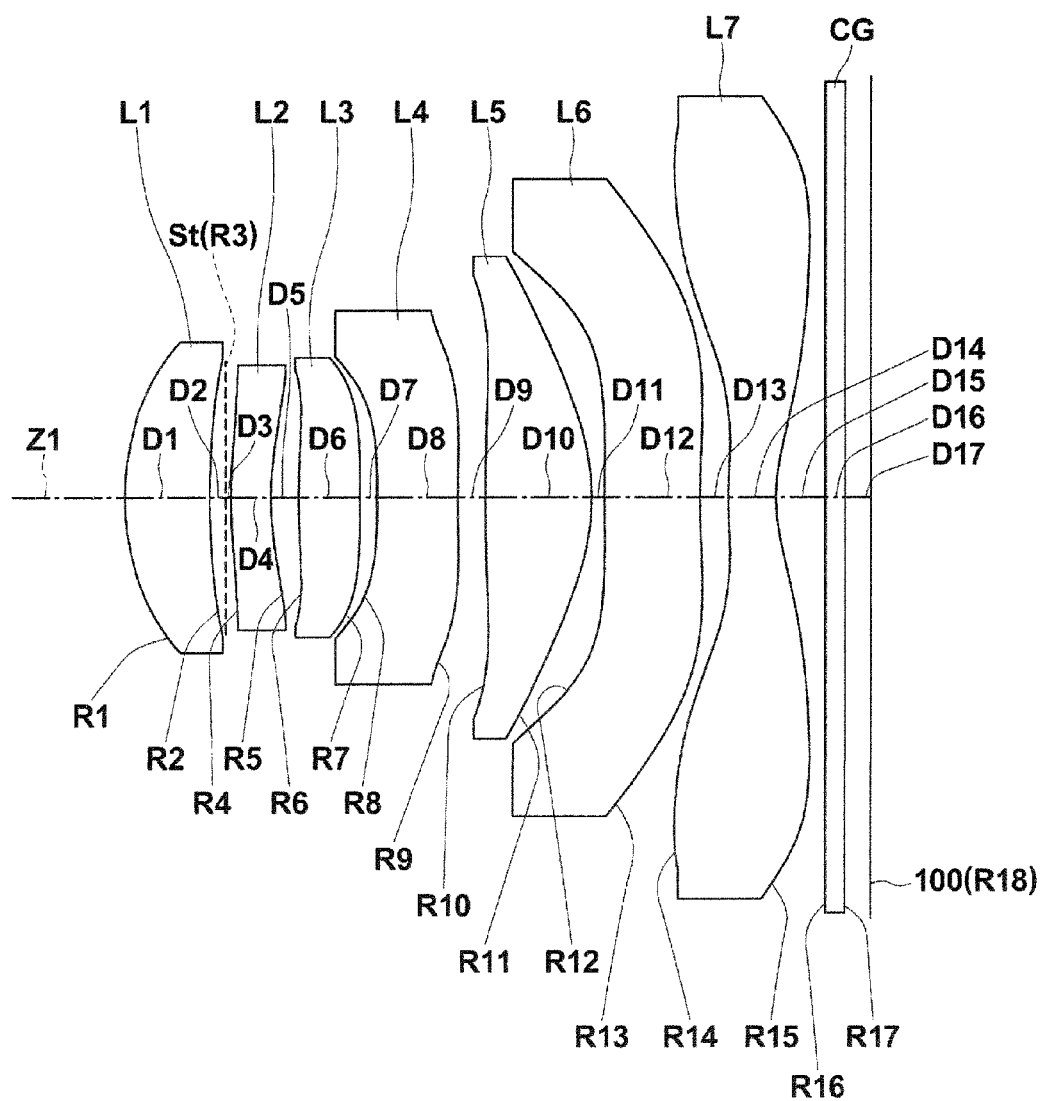
FIG. 1 is a sectional diagram that illustrates a first example of the configuration of an imaging lens according to an embodiment of the present invention, and corresponds to a lens of Example 1.
Figure 2:
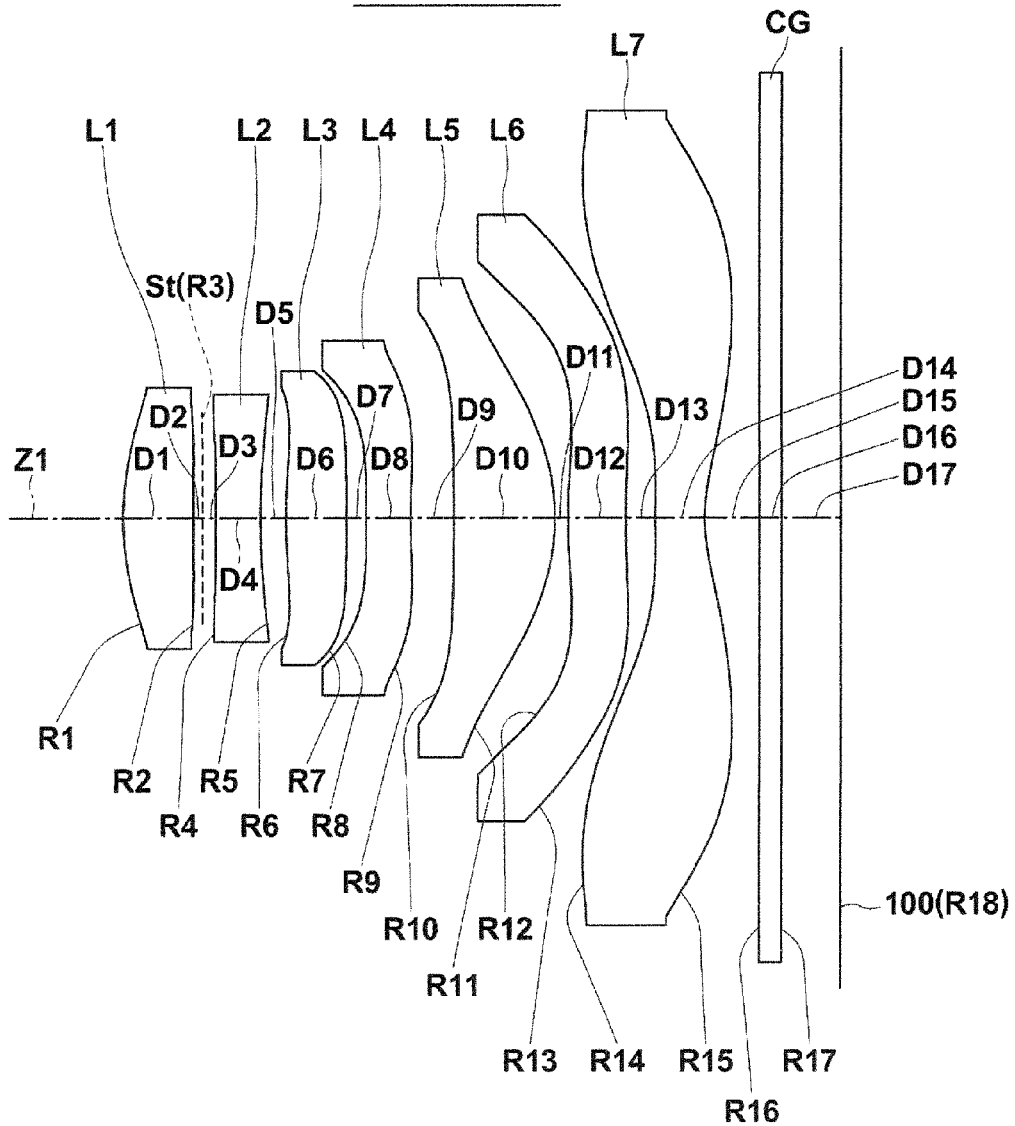
FIG. 2 is a sectional diagram that illustrates a second example of the configuration of an imaging lens according to an embodiment of the present invention, and corresponds to a lens of Example 2.
Figure 3:
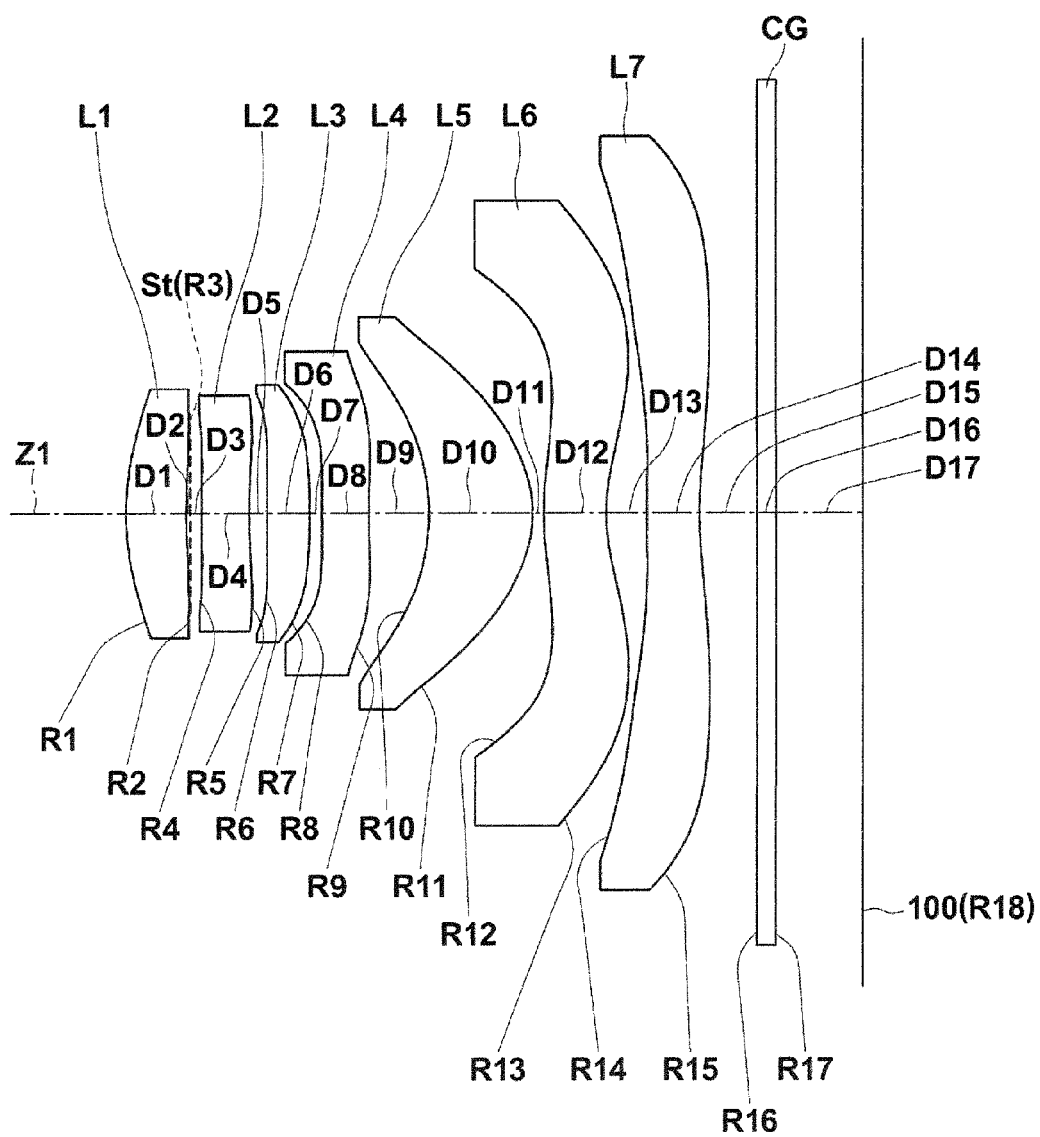
FIG. 3 is a sectional diagram that illustrates a third example of the configuration of an imaging lens according to an embodiment of the present invention, and corresponds to a lens of Example 3.
Figure 4:
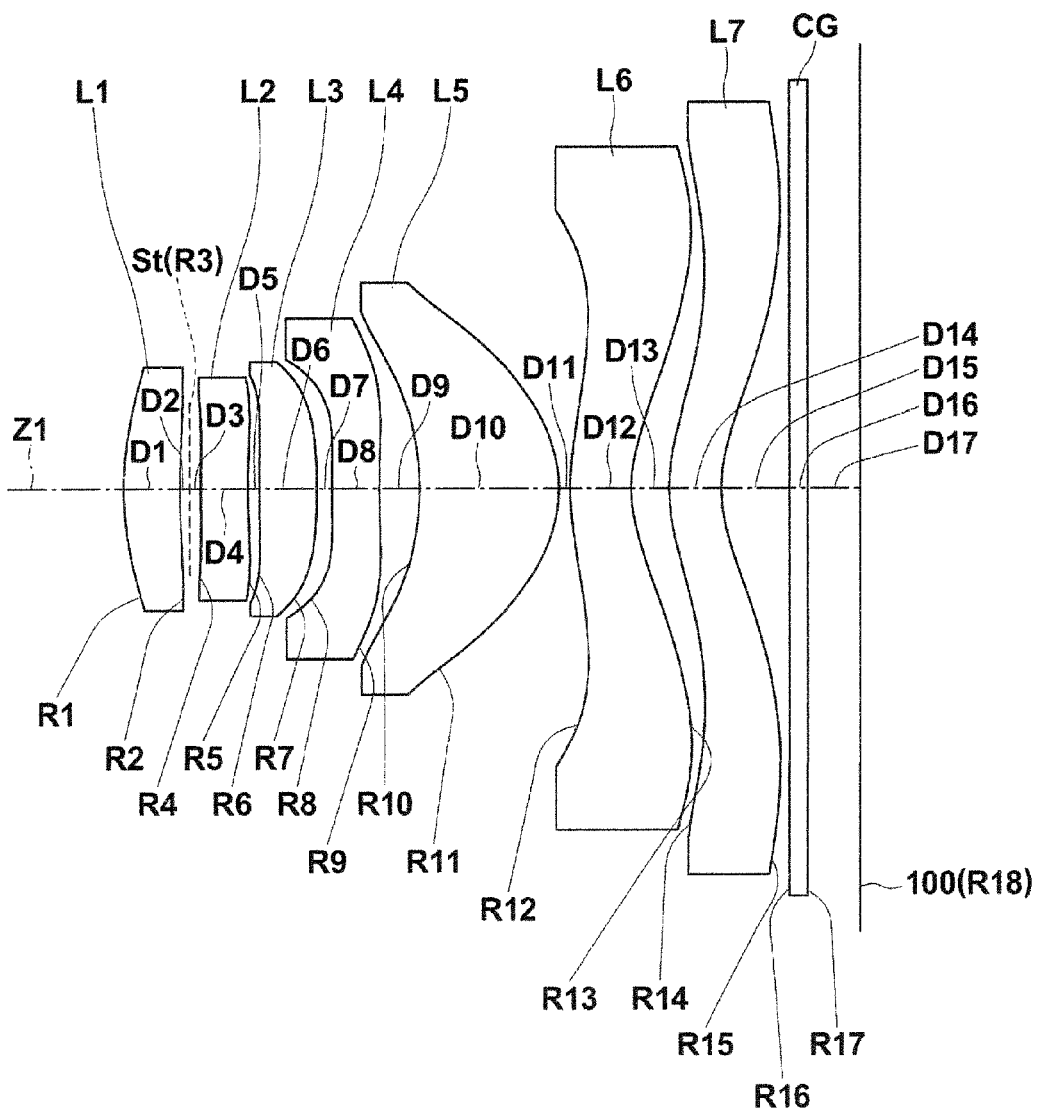
FIG. 4 is a sectional diagram that illustrates a fourth example of the configuration of an imaging lens according to an embodiment of the present invention, and corresponds to a lens of Example 4.
Figure 5:
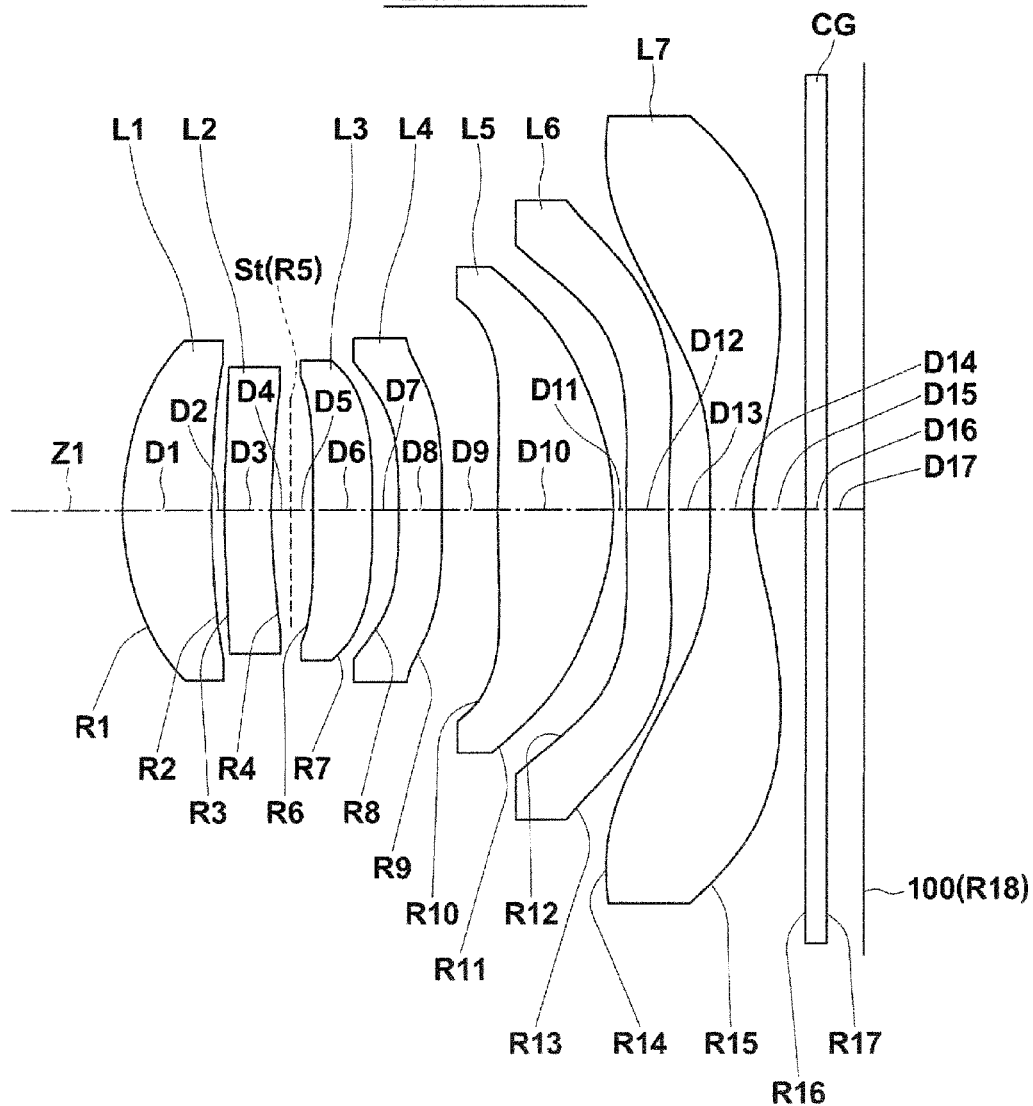
FIG. 5 is a sectional diagram that illustrates a fifth example of the configuration of an imaging lens according to an embodiment of the present invention, and corresponds to a lens of Example 5.
Figure 6:
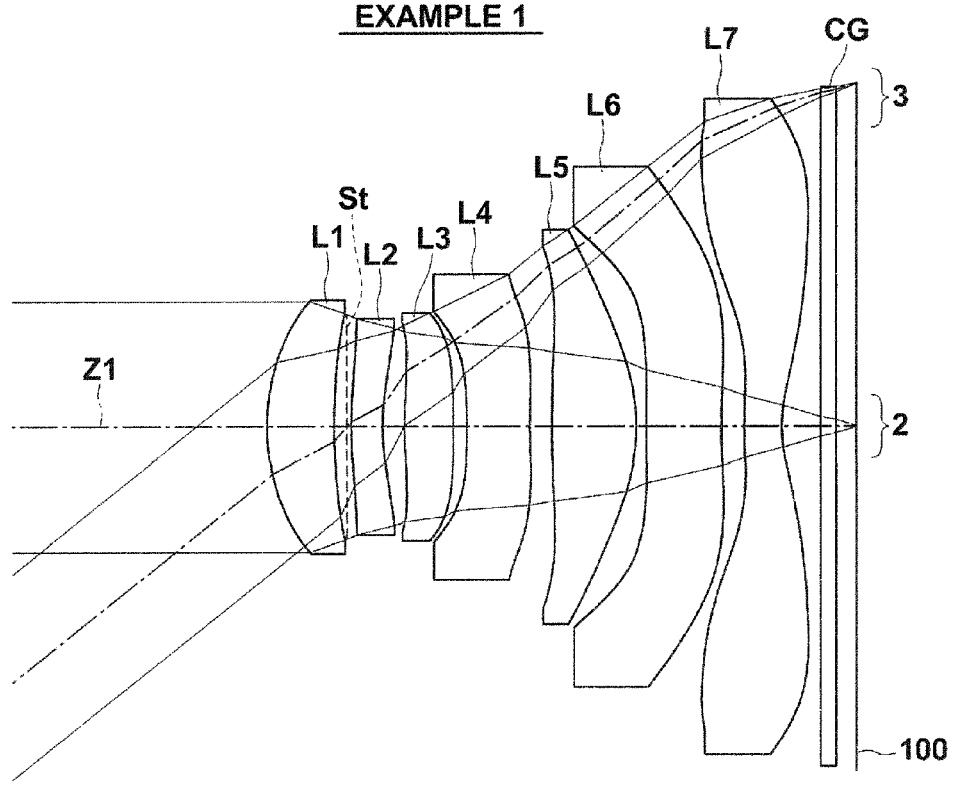
FIG. 6 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 5 and FIG. 14 are sectional diagrams that illustrate second through sixth examples of lens configurations that correspond to Numerical Examples 2 through 6 (Table 3 through Table 12). In FIG. 1 through FIG. 5 and FIG. 14, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIG. 2 through FIG. 5 and FIG. 14 will also be described as necessary. In addition, FIG. 6 is a diagram that illustrates the paths of light rays that pass through the imaging lens L of FIG. 1. FIG. 6 illustrates the paths of an axial light beam 2 and a maximum angle of view light beam 3 from an object at a distance of infinity.

The imaging lens L of the embodiment of the present invention is favorably employed in various imaging devices that employ imaging elements such as a CCD and a CMOS. The imaging lens L of the embodiment of the present invention is particularly favorable for use in comparatively compact portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, a fifth lens L5, a sixth lens L6, and a seventh lens L7 along the optical axis Z1, in this order from the object side.

Figure 12:
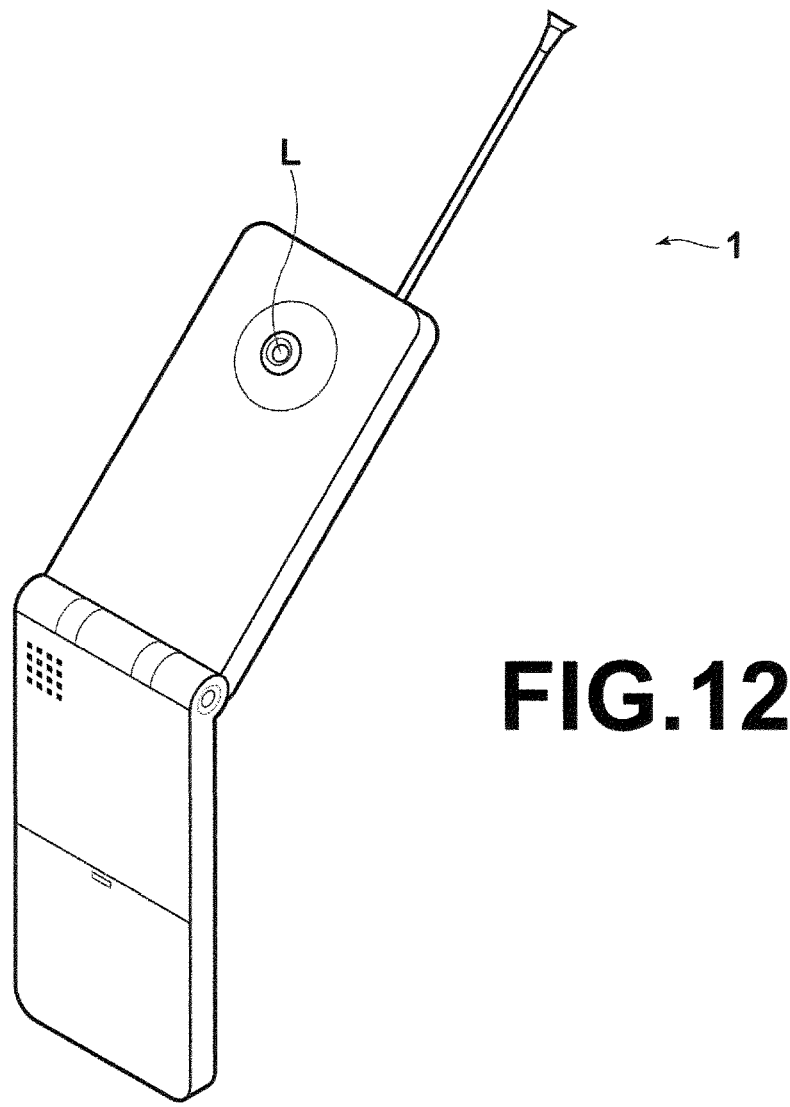
FIG. 12 is a diagram that illustrates a cellular telephone as an imaging apparatus equipped with the imaging lens of the present invention.

FIG. 12 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface R18 in FIG. 1 through FIG. 5 and FIG. 14) of the imaging lens L.

Figure 13:
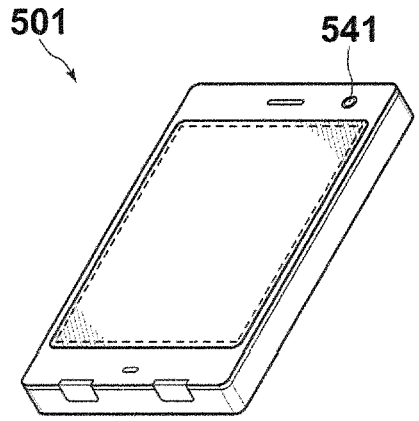
FIG. 13 is a diagram that illustrates a smart phone as an imaging apparatus equipped with the imaging lens of the present invention.
Figure 14:
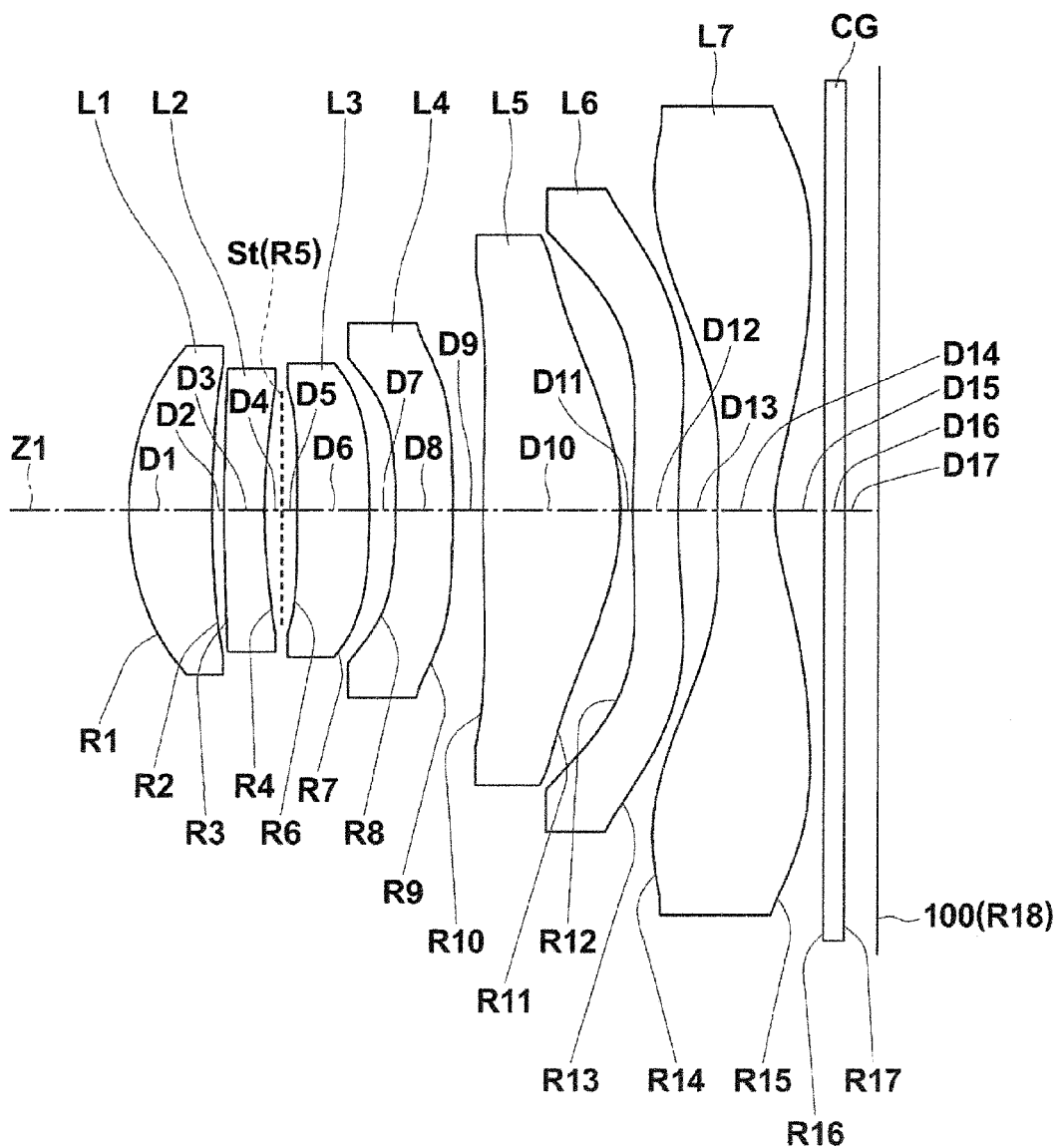
FIG. 14 is a sectional diagram that illustrates a sixth example of the configuration of an imaging lens according to an embodiment of the present invention, and corresponds to a lens of Example 6.

FIG. 13 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface) of the imaging lens L.

Various optical members CG may be provided between the seventh lens L7 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the seventh lens L7 to obtain the same effect as that of the optical member CG. In this case, the number of parts can be reduced, and the total length can be shortened.

It is preferable for the imaging lens L to be equipped with an aperture stop St, provided between the first lens L1 and the second lens L2, or between the second lens L2 and the third lens L3. By providing the aperture stop St between the first lens L1 and the second lens L2, or between the second lens L2 and the third lens L3, the total length can be shortened, while aberrations can be corrected with favorable balance by the lens provided toward the object side of the aperture stop St and the lens provided toward the image side of the aperture stop St. In the present embodiment, the lenses of Examples 1 through 4 (FIGS. 1 through 4) are configurations in which the aperture stop St is provided between the first lens L1 and the second lens L2, and the lenses of Examples 5 and 6 (FIG. 5 and FIG. 14) are configurations in which the aperture stop St is provided between the second lens L2 and the third lens L3. Note that the aperture stops St illustrated in the figures do not necessarily represent the sizes or shapes thereof, but indicate the positions thereof on the optical axis Z1.

In the imaging lens L, the first lens L1 has a positive refractive power in the vicinity of the optical axis. This configuration is advantageous in realizing shortening of the total length of the lens system. In addition, the first lens L1 has a convex surface toward the object side in the vicinity of the optical axis. In this case, sufficiently increasing the positive refractive power of the first lens L1, which bears the main imaging function of the imaging lens L, is facilitated. Therefore, shortening of the total length of the lens system can be realized more favorably. In addition, it is preferable for the first lens L1 to be of a meniscus shape having a convex surface toward the object side in the vicinity of the optical axis, as indicated in each of the Examples. In this case, the rearward principal point of the first lens L1 can be closer to the object side, and shortening of the total length can be realized more favorably.

The second lens L2 has a negative refractive power in the vicinity of the optical axis. Therefore, longitudinal chromatic aberration can be favorably corrected. In addition, in the case that the second lens L2 has a concave surface toward the image side in the vicinity of the optical axis, as shown in each of the Examples, generation of longitudinal chromatic aberrations and field curvature can be suppressed. In addition, the second lens L2 may be of a meniscus shape having a concave surface toward the image side in the vicinity of the optical axis, as shown in Example 1 and Examples 3 through 6. This configuration is advantageous in shortening the total length. Further, the second lens L2 may be of a biconcave shape in the vicinity of the optical axis, as shown in Example 2. In this case, spherical aberration can be favorably corrected.

The third lens has a positive refractive power in the vicinity of the optical axis. This configuration is advantageous in realizing a shortened total length. In addition, it is preferable for the second lens L2 to have a concave surface toward the image side in the vicinity of the optical axis and the third lens L3 to have a convex surface toward the object side in the vicinity of the optical axis as shown in each of the Examples. In this case, shortening of the distance between the surface of the second lens L2 toward the image side and the surface of the third lens L3 toward the object side that face each other is facilitated, and is advantageous in realizing shortening of the total length of the lens system. In addition, the third lens L3 may be of a meniscus shape in the vicinity of the optical axis, as shown in Example 2. In this case, spherical aberration can be favorably corrected, while favorably realizing shortening of the total length of the lens system. Further, the third lens L3 may be of a biconvex shape in the vicinity of the optical axis, as shown in Example 1 and Examples 3 through 6. In this case, longitudinal chromatic aberration can be favorably corrected.

It is preferable for the fourth lens L4 to have a negative refractive power in the vicinity of the optical axis. This configuration enables light to be efficiently secured at peripheral portions. In addition, the fourth lens L4 may be of a meniscus shape in the vicinity of the optical axis as shown in Examples 2 through 6. In this case, shortening of the total length of the lens system can be realized favorably. Further, the fourth lens L4 may be of a biconcave shape in the vicinity of the optical axis, as shown in Example 1. In this case, spherical aberration can be corrected favorably.

The fifth lens L5 has a positive refractive power in the vicinity of the optical axis. This configuration is advantageous in realizing shortening of the total length of the lens system. In addition, the fifth lens L5 may be of a meniscus shape having a convex surface toward the image side in the vicinity of the optical axis, as shown in Examples 2 through 4. In this case, increases in the incident angles of light rays that pass through the imaging lens L into the imaging surface (imaging element) can be favorably suppressed. Further, the fifth lens L5 may be of a biconvex shape in the vicinity of the optical axis, as shown in Examples 1, 5, and 6. In this case, shortening of the total length of the lens system can be realized more favorably.

It is preferable for the sixth lens L6 to be of a meniscus shape in the vicinity of the optical axis, as shown in each of the Examples. In this case, it becomes easier to realize shortening of the total length of the length, and spherical aberration can be favorably corrected. In addition, the sixth lens L6 may have a negative refractive power or a positive refractive power in the vicinity of the optical axis as long as a desired performance can be realized. In the case that the sixth lens L6 has a positive refractive power in the vicinity of the optical axis as shown in Examples 2 and 5, astigmatism can be favorably corrected. Alternatively, in the case that the sixth lens L6 has a negative refractive power in the vicinity of the optical axis as shown in Examples 1, 3, 4, and 6, light at peripheral portions will be secured easily.

The seventh lens L7 has a negative refractive power in the vicinity of the optical axis. This configuration enables field curvature to be favorably corrected, while realizing shortening of the total length of the lens system. In addition, the seventh lens L7 has a concave surface toward the image side in the vicinity of the optical axis. Therefore, field curvature can be favorably corrected, while realizing shortening of the total length of the lens system more favorably.

In addition, the seventh lens L7 has a concave surface toward the image side in the vicinity of the optical axis, and the surface toward the image side is of an aspherical shape having at least one inflection point within the effective diameter thereof. For example, in the case that the seventh lens L7 is a spherical lens having a concave surface toward the image side and the surface of the seventh lens L7 toward the image side has a radius of curvature with a small absolute value, shortcomings, such as the incident angles of light rays at peripheral angles of view into the imaging surface increasing and light rays at peripheral angles of view not reaching the imaging surface due to being totally reflected, may arise. However, the seventh lens L7 is configured to have a concave surface toward the image side in the vicinity of the optical axis and the surface toward the image side is of an aspherical shape having at least one inflection point within the effective diameter thereof. Therefore, increases in the incident angles of light rays that pass through the optical system at peripheral angles of view into the imaging surface (imaging element) can be suppressed, particularly at the peripheral portions of an imaging region, and the occurrence of the aforementioned shortcoming caused by total reflection of light rays at peripheral angles of view can be suppressed. Note that the "inflection point" on the surface of the seventh lens L7 toward the image side refers to a point at which the shape of the surface of the seventh lens L7 toward the image side changes from a convex shape to a concave shape (or from a concave shape to a convex shape) with respect to the image side. The position of the inflection point may be any arbitrary position within a range from the optical axis outward in the radial direction to the effective diameter of the surface of the seventh lens L7 toward the image side. Note that here, the peripheral portions of the imaging region refer to portions toward the exterior of approximately 50% to 70% of the effective diameter.

In addition, it is preferable for the seventh lens L7 to be of a meniscus shape having a concave surface toward the image side as shown in each of the Examples. In this case, the necessity to excessively increase the negative refractive power of the seventh lens becomes less likely to occur, which is advantageous in realizing shortening of the total length of the lens system.

Further, each of the lenses L1 through L7 that constitute the imaging lens L is a single lens, not a cemented lens. In lens systems equipped with cemented lenses, in which lenses formed by materials having different linear coefficients of thermal expansion are cemented together, there is a possibility that aberrations caused by differences in linear coefficients of thermal expansion will be generated at the bonding surfaces of the cemented lenses due to changes in temperature. However, each of the lenses L1 through L7 that constitute the imaging lens L are not cemented lenses but single lenses. Therefore, the generation of aberrations at the bonding surfaces of cemented lenses caused by differences in linear coefficients of thermal expansion can be suppressed. In addition, production costs can be suppressed compared to those for imaging lenses equipped with cemented lenses such as the imaging lenses of Japanese Unexamined Patent Publication Nos. 7 (1995)-281089 and 2012-068448, because bonding steps during production of the imaging lens and the cost of adhesive agents are obviated. In addition, by all of the lenses being single lenses, the number of lens surfaces is grater than that for a case in which any of the lenses are cemented lenses. Therefore, the degree of freedom in the design of each lens is increased, and the lens can be favorably designed to have a shorter total length.

According to the imaging lens L described above, the configurations of each of the first lens through the seventh lens are optimized as lens elements in a lens configuration having a total of seven lenses. Therefore, a lens system having a shortened total length, a small F number, and high imaging performance from the central angle of view to peripheral angles of view can be realized.

It is preferable for at least one of the surfaces of each of the first lens L1 through the seventh lens L7 of the imaging L to be an aspherical surface, in order to improve performance.

Next, the operation and effects of conditional formulae related to the imaging lens L will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the combined focal length f12 of the first lens L1 and the second lens L2 and the focal length f of the entire system to satisfy Conditional Formula (1) below.

$$0 < f/f12 \qquad (1)$$

Conditional Formula (1) defines a preferable range of numerical values for the ratio of the focal length f of the entire system with respect to the combined focal length f12 of the first lens L1 and the second lens L2. The combined refractive power of the first lens L1 and the second lens L2 will not become excessively weak with respect to the refractive power of the entire system, by securing a combined refractive power of the first lens L1 and the second lens L2 such that the value of f/f12 does not become less than or equal to the lower limit defined in Conditional Formula (1). As a result, the total length of the lens system can be shortened favorably. It is more preferable for the lower limit of Conditional Formula (1-1) to be satisfied, and even more preferable for the lower limit of Conditional Formula (1-2) to be satisfied, in order to cause this advantageous effect to become more prominent. In addition, by maintaining the combined refractive power of the first lens L1 and the second lens L2 such that the value of f/f12 is not greater than or equal to the upper limit defined in Conditional Formula (1-1), the combined refractive power of the first lens L1 and the second lens L2 will not be excessively strong with respect to the refractive power of the entire system. As a result, spherical aberration and longitudinal chromatic aberration can be favorably corrected. It is more preferable for the upper limit of Conditional Formula (1-2) to be satisfied, in order to cause these advantageous effects to become more prominent.

$$0 < f/f12 < 5 \quad (1\text{-}1)$$

$$0.2 < f/f12 < 1 \quad (1\text{-}2)$$

It is preferable for the focal length f2 of the second lens L2 and the focal length f of the entire system to satisfy Conditional Formula (2) below.

$$f/f2 < -0.1 \quad (2)$$

Conditional Formula (2) defines the preferred range of numerical values for the ratio of the focal length f of the entire system with respect to the focal length f2 of the second lens L2. By securing the refractive power of the second lens L2 such that the value of f/f2 is not greater than or equal to the upper limit defined in Conditional Formula (2), the negative refractive power of the second lens L2 will not become excessively weak with respect to the refractive power of the entire system. As a result, longitudinal chromatic aberration can be favorably corrected. It is more preferable for the upper limit of Conditional Formula (2-1) to be satisfied, and even more preferable for the upper limit of Conditional Formula (2-2) to be satisfied, in order to cause this advantageous effect to become more prominent. In addition, it is preferable for the refractive power of the second lens L2 to be maintained such that the value of f/f2 is not less than or equal to the lower limit defined in Conditional Formula (2). In this case, the negative refractive power of the second lens L2 will not become excessively strong with respect to the refractive power of the entire system. As a result, the total length of the lens system can be shortened favorably. It is more preferable for the lower limit of Conditional Formula (2-2) to be satisfied, in order to cause this advantageous effect to become more prominent.

$$-1 < f/f2 < -0.2 \quad (2\text{-}1)$$

$$-0.8 < f/f2 < -0.2 \quad (2\text{-}2)$$

In addition, it is preferable for the focal length f1 of the first lens L1 and the focal length f of the entire system to satisfy Conditional Formula (3) below.

$$0 < f/f1 < 2.5 \quad (3)$$

Conditional Formula (3) defines the preferred range of numerical values for the ratio of the focal length f of the entire system with respect to the focal length f1 of the first lens L2. By securing the refractive power of the second lens L1 such that the value of f/f1 is not less than or equal to the lower limit defined in Conditional Formula (3), the refractive power of the first lens L1 will not become excessively weak with respect to the refractive power of the entire system. As a result, the total length of the lens system can be favorably shortened. In addition, it is preferable for the refractive power of the first lens L1 to be maintained such that the value of f/f1 is not greater than or equal to the upper limit defined in Conditional Formula (3). In this case, the refractive power of the first lens L1 will not become excessively strong with respect to the refractive power of the entire system. As a result, spherical aberration can be favorably corrected. It is more preferable for Conditional Formula (3-1) to be satisfied, and even more preferable for Conditional Formula (3-2) to be satisfied, in order to cause these advantageous effects to become more prominent.

$$0.5 < f/f1 < 2 \quad (3\text{-}1)$$

$$0.55 < f/f2 < 1.5 \quad (3\text{-}2)$$

In addition, it is preferable for the focal length f3 of the third lens L3 and the focal length f of the entire system to satisfy Conditional Formula (4) below.

$$0 < f/f3 \quad (4)$$

Conditional Formula (4) defines a preferable range of numerical values for the ratio of the focal length f of the entire system with respect to the focal length f3 of the third lens L3. The refractive power of the third lens L3 will not become excessively weak with respect to the refractive power of the entire system, by securing a refractive power of the third lens L3 such that the value of f/f3 does not become less than or equal to the lower limit defined in Conditional Formula (4). As a result, the total length of the lens system can be shortened favorably. It is more preferable for the lower limit of Conditional Formula (4-1) to be satisfied, and even more preferable for the lower limit of Conditional Formula (4-2) to be satisfied, in order to cause this advantageous effect to become more prominent. In addition, by maintaining the refractive power of the third lens L3 such that the value of f/f3 is not greater than or equal to the upper limit defined in Conditional Formula (4-1), the refractive power of the third lens L3 will not be excessively strong with respect to the refractive power of the entire system. As a result, spherical aberration can be favorably corrected. It is more preferable for the upper limit of Conditional Formula (4-2) to be satisfied, in order to cause this advantageous effect to become more prominent.

$$0.32 < f/f3 < 1 \quad (4\text{-}1)$$

$$0.35 < f/f3 < 0.6 \quad (4\text{-}2)$$

In addition, it is preferable for the focal length f4 of the fourth lens L4 and the focal length f of the entire system to satisfy Conditional Formula (5) below.

$$f/f4 < 0 \quad (5)$$

Conditional Formula (5) defines a preferable range of numerical values for the ratio of the focal length f of the entire system with respect to the focal length f4 of the fourth lens L4. The refractive power of the fourth lens L4 will not become excessively weak with respect to the refractive power of the entire system, by securing a refractive power of the fourth lens L4 such that the value of f/f4 does not become greater than or equal to the upper limit defined in Conditional Formula (5). As a result, field curvature can be favorably corrected, particularly at intermediate angles of view. It is more preferable for the upper limit of Conditional Formula (5-1) to be satisfied, and even more preferable for the upper limit of Conditional Formula (5-2) to be satisfied, in order to cause this advantageous effect to become more prominent. In addition, by maintaining the refractive power of the fourth lens L4 such that the value of f/f4 is not less than or equal to the lower limit defined in Conditional Formula (5-1), the negative refractive power of the fourth lens L4 will not be excessively strong with respect to the refractive power of the entire system. As a result, chromatic aberration in the vicinity of the optical axis can be suppressed. It is more preferable for the lower limit of Conditional Formula (5-2) to be satisfied, in order to cause this advantageous effect to become more prominent.

$$-0.65 < f/f4 < 0 \quad (5\text{-}1)$$

$$-0.6 < f/f4 < -0.1 \quad (5\text{-}2)$$

In addition, it is preferable for the thickness Da of the first lens L1 along the optical axis and the focal length f of the entire system to satisfy Conditional Formula (6) below.

$$0.08 < Da/f \tag{6}$$

Conditional Formula (6) defines a preferable range of numerical values for the ratio of the thickness Da of the first lens L1 along the optical axis with respect to the focal length f of the entire system. By securing a thickness Da of the first lens L1 along the optical axis with respect to the focal length f of the entire system such that the value of Da/f is not less than or equal to the lower limit defined in Conditional Formula (6), astigmatism can be favorably corrected, and the thickness of the peripheral portions of the first lens L1 becoming excessively thin can be suppressed, which is advantageous from the viewpoint of production. It is more preferable for the lower limit of Conditional Formula (6-1) to be satisfied, and even more preferable for the lower limit of Conditional Formula (6-2) to be satisfied, in order to cause these advantageous effects to become more prominent. In addition, by maintaining the thickness Da of the first lens L1 along the optical axis such that the value of Da/f does not become greater than or equal to the upper limit defined in Conditional Formula (6-1), the distance between the surface of the first lens L1, which has a positive refractive power, toward the object side and an entrance pupil can be maintained so as to not be excessively great. As a result, an increase in the effective diameter of the first lens L1 can be suppressed. It is more preferable for the upper limit defined in Conditional Formula (6-2) to be satisfied, in order to cause this advantageous effect to become more prominent. Note that in each of the Examples, the thickness Da of the first lens L1 along the optical axis corresponds to D1 shown in Tables 1, 3, 5, 7, 8, and 11 to be described later.

$$0.1 < Da/f < 0.3 \tag{6-1}$$

$$0.12 < Da/f < 0.2 \tag{6-2}$$

In addition, it is preferable for the thickness Db of the second lens L2 along the optical axis and the focal length f of the entire system to satisfy Conditional Formula (7) below.

$$0.05 < Db/f < 0.3 \tag{7}$$

Conditional Formula (7) defines a preferable range of numerical values for the ratio of the thickness Db of the second lens L2 along the optical axis with respect to the focal length f of the entire system. By securing a thickness Db of the second lens L2 along the optical axis with respect to the focal length f of the entire system such that the value of Db/f is not less than or equal to the lower limit defined in Conditional Formula (7), the physical strength of the lens can be maintained. As a result, deformation and damage during production can be suppressed. In addition, by maintaining the thickness Db of the second lens L2 along the optical axis such that the value of Db/f does not become greater than or equal to the upper limit defined in Conditional Formula (7), the generation of longitudinal chromatic aberration can be suppressed to a degree which is capable of being corrected by the imaging lens L as a whole. It is preferable for Conditional Formula (7-1) to be satisfied, and more preferable for Conditional Formula (7-2) to be satisfied, in order to cause these advantageous effects to become more prominent. Note that in each of the Examples, the thickness Db of the second lens L2 along the optical axis corresponds to D4 in Tables 1, 3, 5, and 7 to be described later, and to D3 in Tables 9 and 11 to be described later.

$$0.06 < Db/f < 0.2 \tag{7-1}$$

$$0.06 < Db/f < 0.12 \tag{7-2}$$

In addition, it is preferable for the distance Dc from the surface of the first lens L1 toward the object side to the surface of the second lens L2 toward the image side along the optical axis and the focal length f of the entire system to satisfy Conditional Formula (8) below.

$$0.2 < Dc/f < 0.5 \tag{8}$$

Conditional Formula (8) defines a preferable range of numerical values for the ratio of the distance Dc from the surface of the first lens L1 toward the object side to the surface of the second lens L2 toward the image side along the optical axis with respect to the focal length f of the entire system. By securing a distance Dc from the surface of the first lens L1 toward the object side to the surface of the second lens L2 toward the image side along the optical axis with respect to the focal length f of the entire system such that the value of Dc/f is not less than or equal to the lower limit defined in Conditional Formula (8), the influence of production errors with respect to the distance Dc from the surface of the first lens L1 toward the object side to the surface of the second lens L2 toward the image side along the optical axis can be decreased. In addition, by maintaining the distance Dc from the surface of the first lens L1 toward the object side to the surface of the second lens L2 toward the image side along the optical axis such that the value of Dc/f does not become greater than or equal to the upper limit defined in Conditional Formula (8), the necessity to increase the negative refractive power of the second lens L2 to be excessively strong will be obviated, and the generation of longitudinal chromatic aberration can be suppressed. It is preferable for Conditional Formula (8-1) to be satisfied, and more preferable for Conditional Formula (8-2) to be satisfied, in order to cause these advantageous effects to become more prominent. Note that in each of the Examples, the distance Dc from the surface of the first lens L1 toward the object side to the surface of the second lens L2 toward the image side along the optical axis corresponds to the sums of D1, D2, D3, and D4 in Tables 1, 3, 5, and 7 to be described later, and to the sums of D1, D2, and D3 in Tables 9 and 11 to be described later.

$$0.21 < Dc/f < 0.4 \tag{8-1}$$

$$0.22 < Dc/f < 0.3 \tag{8-2}$$

As described above, in the imaging lens L according to the embodiment of the present invention, the configuration of each lens element in a seventh lens configuration is optimized, and all of the lenses are single lenses. Therefore, a lens system having a short total length, a small F number, and high imaging performance from the central angle of view to peripheral angles of view can be realized. In addition, the imaging lens L according to the embodiment of the present invention has a small F number of 3 or less, and may be favorably applied to cellular telephones, smart phones, tablet terminals, etc. In contrast, the imaging lens disclosed in Japanese Unexamined Patent Publication No. 7 (1995)-281089 has a large F number of 4.66, and it is difficult to be employed in applications that require compatibility with imaging elements having a great number of pixels.

If the first lens L1 through the seventh lens L7 of the imaging lens L are configured such that the full angle of view thereof is 70 degrees or greater as in the imaging lenses of Examples 1 through 6, the imaging lens L can be favorably applied to cellular telephones and the like. As a result, it will become possible to meet the demand to obtain images, which are photographed at high resolution with a wide angle of view, and to obtain desired image portions within the photographed images by enlarging the desired image portions.

Further improved imaging performance can be realized by satisfying preferred conditions appropriately. In addition, the imaging apparatuses according to the embodiments of the present invention output image signals corresponding to optical images formed by the high performance imaging lenses according to the embodiments of the present invention. Therefore, images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first (the aperture stop St being number 1), are shown in the column Si for the imaging lens of Example 1. The radii of curvature (mm) of ith surfaces from the object side corresponding to the symbols Ri illustrated in FIG. 1 are shown in the column Ri. Similarly, the distances between an ith surface and an i+1st surface from the object side along the optical axis Z are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj Note that the values of the focal length f (mm) of the entire system and back focus Bf (mm) are shown as data for each lens datum. Note that the back focus Bf is represented as air converted values.

In the imaging lens of Example 1, both of the surfaces of the first lens L1 through the seventh lens L7 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "1.0·10$^{-2}$".

The values of coefficients Ai and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the peak of the aspherical surface.

$$Z = C \cdot h^2 / \{1 + (1 - KA \cdot C^2 \cdot h^2)\} + \Sigma Ai \cdot h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater), and KA is an aspherical surface coefficient.

Specific lens data corresponding to the configurations of the imaging lenses illustrated in FIG. 2 through FIG. 5 and FIG. 14 are shown in Table 3 through Table 12 as Example 2 through Example 6. In the imaging lenses of Examples 1 through 6, both of the surfaces of the first lens L1 through the seventh lens L7 are all aspherical surfaces.

Figure 7:
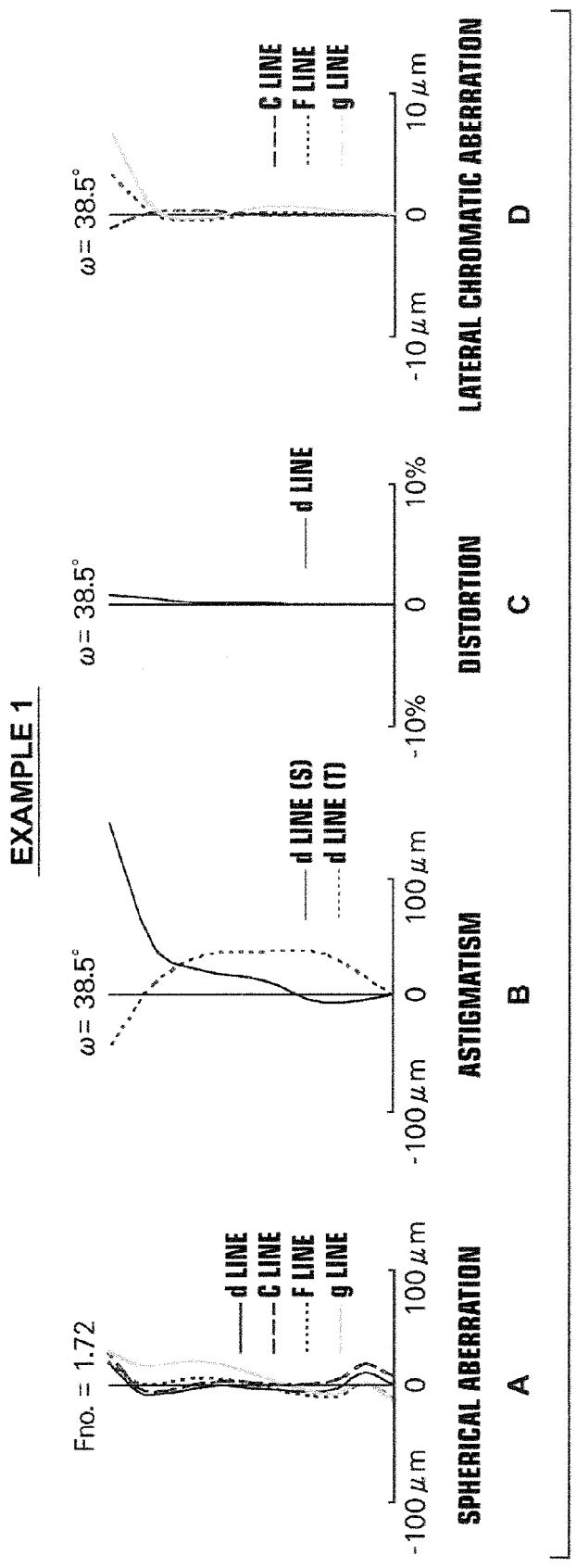
FIG. 7 is a collection of diagrams that illustrate aberrations of the imaging lens of Example 1, wherein A illustrates spherical aberration, B illustrates astigmatic aberration (field curvature), C illustrates distortion, and D illustrates lateral chromatic aberration.

A through D of FIG. 7 are diagrams that illustrate the spherical aberration, the astigmatic aberration, the distortion, and the lateral chromatic aberration of the imaging lens of Example 1, respectively. Each of the diagrams that illustrate the spherical aberration, the astigmatic aberration (field curvature), and the distortion illustrate aberrations using the d line (wavelength: 587.56 nm) as a standard wavelength. The diagrams that illustrate spherical aberration and lateral chromatic aberration also show aberrations related to the F line (wavelengths: 486.1 nm) and the C line (wavelength: 656.27 nm). In addition, the diagram that illustrates spherical aberration also show aberrations related to the g line (wavelength: 435.83 nm). In the diagrams that illustrate astigmatic aberrations, aberrations in the sagittal direction (S) are indicated by solid lines, while aberrations in the tangential direction (T) are indicated by broken lines. In addition, "Fno." denotes F numbers, and "ω" denotes half angles of view.

Figure 8:
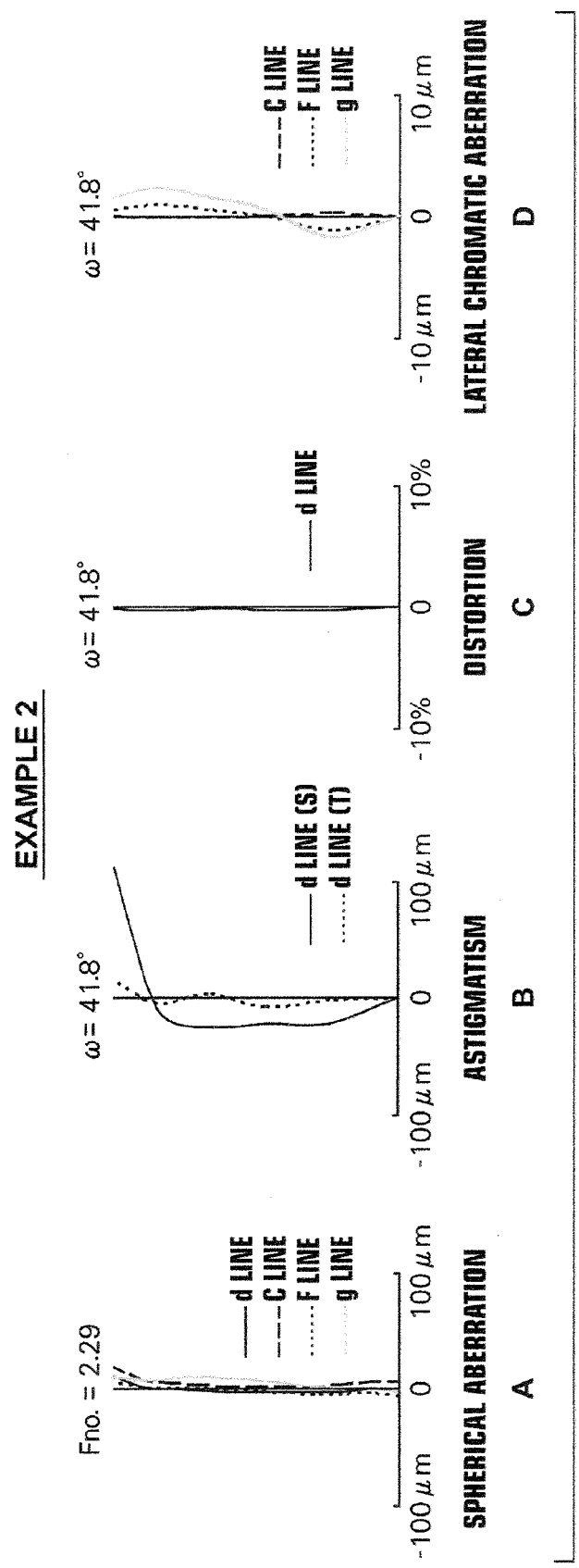
FIG. 8 is a collection of diagrams that illustrate aberrations of the imaging lens of Example 2, wherein A illustrates spherical aberration, B illustrates astigmatic aberration (field curvature), C illustrates distortion, and D illustrates lateral chromatic aberration.
Figure 9:
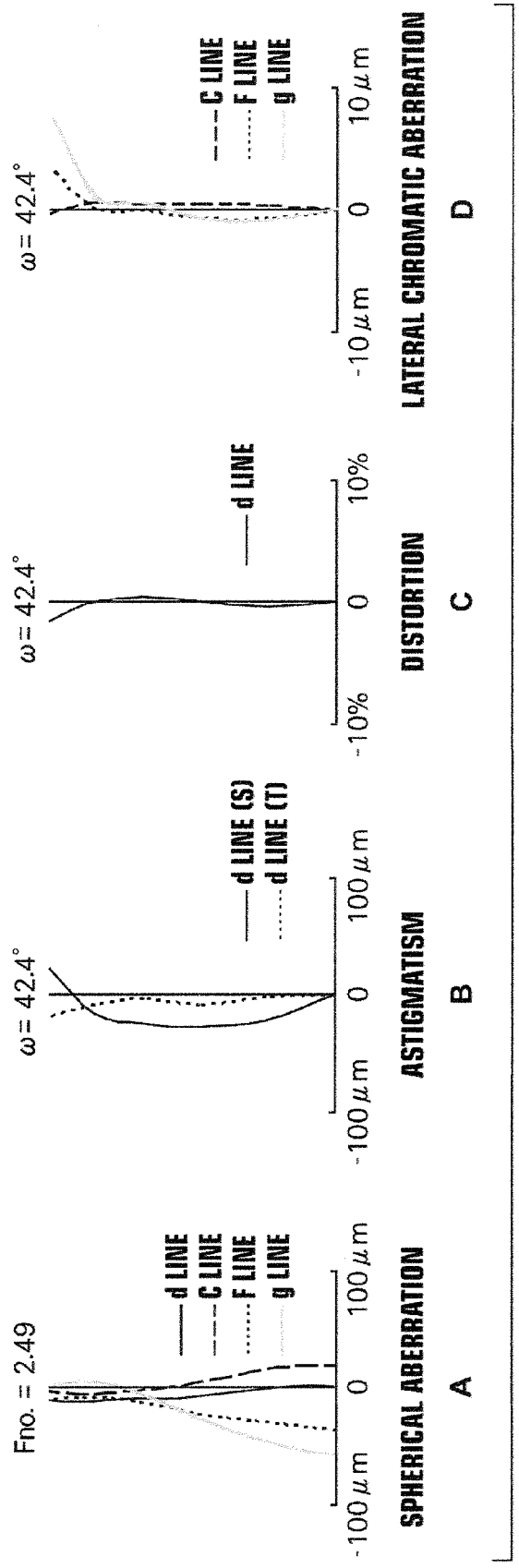
FIG. 9 is a collection of diagrams that illustrate aberrations of the imaging lens of Example 3, wherein A illustrates spherical aberration, B illustrates astigmatic aberration (field curvature), C illustrates distortion, and D illustrates lateral chromatic aberration.
Figure 10:
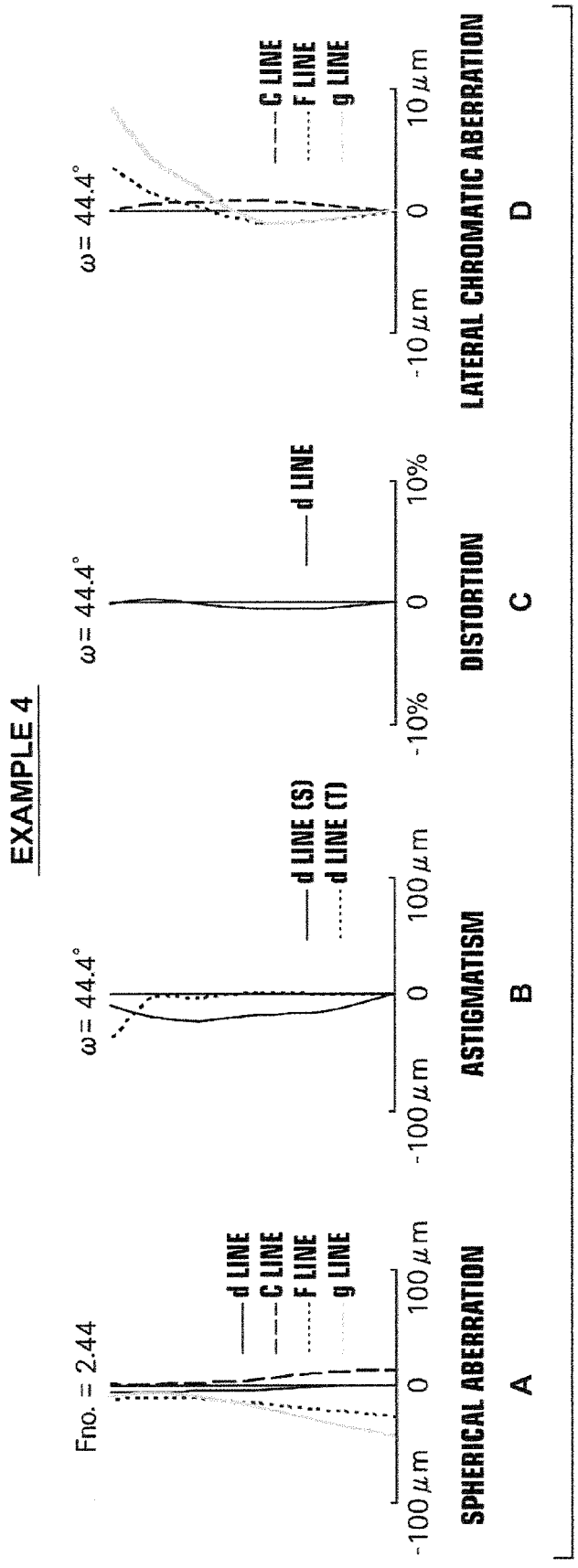
FIG. 10 is a collection of diagrams that illustrate aberrations of the imaging lens of Example 4, wherein A illustrates spherical aberration, B illustrates astigmatic aberration (field curvature), C illustrates distortion, and D illustrates lateral chromatic aberration.
Figure 11:
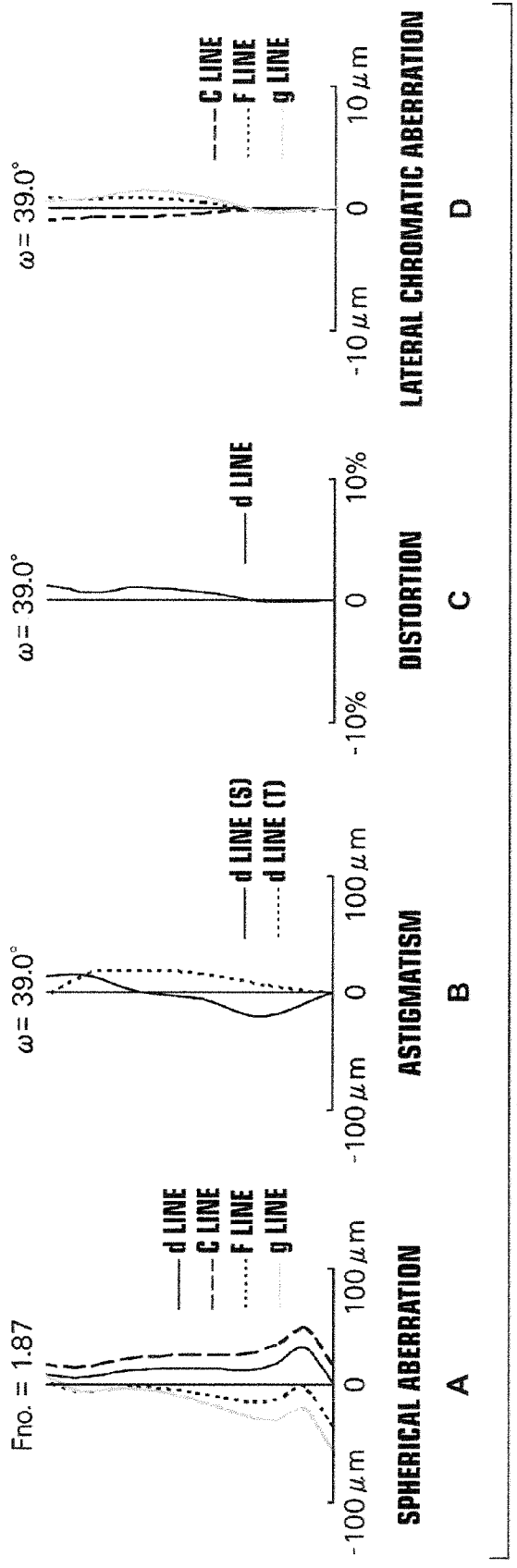
FIG. 11 is a collection of diagrams that illustrate aberrations of the imaging lens of Example 5, wherein A illustrates spherical aberration, B illustrates astigmatic aberration (field curvature), C illustrates distortion, and D illustrates lateral chromatic aberration.

Similarly, the aberrations of the imaging lens of Example 2 through Example 6 are illustrated in A through D of FIG. 8 through A through D of FIG. 11 and A through D of FIG. 15.

Table 13 shows values corresponding to Conditional Formulae (1) through (8) of Examples 1 through 6.

As can be understood from each set of numerical value data and from the diagrams that illustrate aberrations, each of the Examples favorably corrects distortion, and simultaneously realizes a wide angle of view and high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 6.739, Bf = 1.095

| Si | Ri | Di | Ndj | vdj |
|---|---|---|---|---|
| *1 | 3.47747 | 1.060 | 1.68930 | 53.08 |
| *2 | 9.37705 | 0.202 | | |
| 3 (aperture stop) | ∞ | 0.067 | | |
| *4 | 6.14655 | 0.500 | 1.63351 | 23.63 |
| *5 | 3.88806 | 0.353 | | |
| *6 | 11.16913 | 0.765 | 1.54492 | 55.89 |
| *7 | −44.98745 | 0.219 | | |
| *8 | −13.84008 | 0.997 | 1.63351 | 23.63 |
| *9 | 18.01047 | 0.343 | | |
| *10 | 24.34916 | 1.325 | 1.54492 | 55.89 |
| *11 | −3.60968 | 0.162 | | |
| *12 | 15.71880 | 1.197 | 1.63351 | 23.63 |
| *13 | 8.22700 | 0.354 | | |
| *14 | 5.21116 | 0.594 | 1.54492 | 55.89 |
| *15 | 2.12666 | 0.612 | | |
| 16 | ∞ | 0.250 | 1.51633 | 64.14 |
| 17 | ∞ | 0.319 | | |
| 18 (imaging surface) | ∞ | | | |

*aspherical surface

TABLE 2

Example 1: Aspherical Surface Data

| Surface Number | KA | A3 | A4 | A5 | A6 |
|---|---|---|---|---|---|
| 1 | −5.2374676E+00 | −9.3429505E−04 | 2.7470406E−02 | −2.3848542E−02 | 3.6072672E−02 |
| 2 | 4.5076031E+00 | 4.4862843E−03 | −3.4085257E−02 | 5.9217277E−02 | −8.0733107E−02 |
| 4 | 9.6088687E−01 | 1.6957528E−02 | −4.6784545E−02 | 2.5437122E−02 | −4.2500217E−02 |
| 5 | −5.1023505E+00 | 1.7876909E−02 | −1.0816532E−01 | 1.9953201E−01 | −2.8864856E−01 |
| 6 | −2.6062805E+00 | 4.1312206E−03 | −3.3493674E−02 | 3.7824694E−02 | −4.5561147E−02 |
| 7 | −4.9710910E+01 | −1.5818014E−02 | 7.1751700E−02 | −2.8716132E−01 | 4.6589347E−01 |
| 8 | −1.7635966E+01 | −4.6725404E−03 | −2.4429649E−02 | −3.9917885E−02 | 4.6973271E−02 |
| 9 | −3.2795904E+00 | −1.2492831E−02 | 8.5787386E−03 | −6.0589418E−02 | 7.6406391E−02 |
| 10 | −1.8886232E+01 | 4.7047788E−03 | −1.8321446E−02 | 2.1074736E−02 | −1.0944237E−02 |
| 11 | 1.0000000E+00 | −2.6021650E−02 | 7.6638927E−04 | 1.7109629E−02 | −2.4047063E−03 |
| 12 | 1.0000000E+00 | −3.7783813E−02 | 2.6087066E−04 | 3.9154658E−03 | 5.1903010E−04 |
| 13 | 1.2491952E+00 | −4.1437989E−02 | 1.2733968E−02 | −6.3995069E−03 | −3.4053279E−04 |
| 14 | 5.3601038E−02 | −3.2954049E−03 | −9.6534337E−02 | 5.2067564E−02 | −4.0083381E−03 |
| 15 | −4.7906448E+00 | −3.4090307E−03 | −5.7749844E−02 | 3.5709106E−02 | −6.6091079E−03 |

| | A7 | A8 | A9 | A10 |
|---|---|---|---|---|
| 1 | −3.5796103E−02 | 2.0286100E−02 | −6.0959573E−03 | 7.8783385E−04 |
| 2 | 8.2194789E−02 | −5.1479112E−02 | 1.7486376E−02 | −2.4515160E−03 |
| 3 | 7.5350714E−02 | −6.0148594E−02 | 2.2357830E−02 | −3.2283827E−03 |
| 4 | 2.7817149E−01 | −1.5940268E−01 | 4.8823586E−02 | −6.2186699E−03 |
| 6 | 2.8705319E−02 | −9.3160095E−03 | 1.3756118E−03 | −3.6112793E−04 |
| 7 | −4.4950385E−01 | 2.5381873E−01 | −7.8150673E−02 | 1.0142423E−02 |
| 8 | −2.7266659E−02 | 4.0779807E−03 | 2.1974741E−03 | −5.2918797E−04 |
| 9 | −5.8085663E−02 | 2.6016162E−02 | −6.2448934E−03 | 6.4972522E−04 |
| 10 | 2.3520228E−03 | −7.9344231E−04 | 3.8013797E−04 | −6.1025184E−05 |
| 11 | −1.9390695E−03 | 2.9934248E−04 | 1.2889100E−04 | −2.4412132E−05 |
| 12 | −2.2198853E−03 | 2.9408570E−04 | 1.2983639E−04 | −2.0808931E−05 |
| 13 | 6.7746905E−04 | −6.9639289E−05 | −1.1428926E−05 | 1.5647002E−06 |
| 14 | −2.9913304E−03 | 8.7247048E−04 | −9.1762551E−05 | 3.4273555E−06 |
| 15 | −8.3258331E−04 | 5.3838462E−04 | −8.4368245E−05 | 4.6857102E−06 |

TABLE 3

Example 2
f = 6.037, Bf = 1.444

| Si | Ri | Di | Ndj | νdj |
|---|---|---|---|---|
| *1 | 3.56930 | 0.790 | 1.68930 | 53.08 |
| *2 | 36.11400 | 0.102 | | |
| 3 (aperture stop) | ∞ | 0.150 | | |
| *4 | −105.69860 | 0.500 | 1.63351 | 23.63 |
| *5 | 6.81581 | 0.288 | | |
| *6 | 7.04456 | 0.674 | 1.54492 | 55.89 |
| *7 | 75.06060 | 0.224 | | |
| *8 | 98.16887 | 0.500 | 1.63351 | 23.63 |
| *9 | 7.37772 | 0.483 | | |
| *10 | −59.77147 | 1.124 | 1.54492 | 55.89 |
| *11 | −3.24728 | 0.150 | | |
| *12 | 4.55972 | 0.650 | 1.63351 | 23.63 |
| *13 | 7.07563 | 0.330 | | |
| *14 | 13.25910 | 0.555 | 1.54492 | 55.89 |
| *15 | 2.07346 | 0.612 | | |
| 16 | ∞ | 0.250 | 1.51633 | 64.14 |
| 17 | ∞ | 0.667 | | |
| 18 (imaging surface) | ∞ | | | |

*aspherical surface

TABLE 4

Example 2: Aspherical Surface Data

| Surface Number | KA | A3 | A4 | A5 | A6 |
|---|---|---|---|---|---|
| 1 | −5.6268818E+00 | −1.0313686E−03 | 1.8850472E−02 | −1.6959714E−02 | 2.7373124E−02 |
| 2 | 4.2777579E+01 | 2.3478891E−03 | −2.7938943E−02 | 2.7868206E−02 | −4.8891560E−02 |
| 4 | −4.9999193E+01 | −2.4660296E−04 | −2.7066540E−02 | 6.9015878E−03 | −4.9534393E−03 |
| 5 | 9.2503128E+01 | 6.6643018E−03 | −8.2808874E−02 | 1.3419686E−01 | −2.2209125E−01 |
| 6 | −3.3685109E+01 | 9.1275119E−04 | −2.9328335E−02 | 3.0132701E−02 | −5.1160746E−02 |
| 7 | 2.9385898E+01 | −1.3240926E−02 | 4.3014508E−02 | −2.3523200E−01 | 4.4718667E−01 |
| 8 | −4.9992654E+01 | −1.6204471E−03 | −8.0139768E−02 | −5.5285811E−02 | 1.3360824E−01 |
| 9 | 5.9199669E+00 | −1.9838951E−03 | −6.5165576E−02 | −4.9442736E−02 | 1.0660864E−01 |
| 10 | 4.4454767E+01 | −1.4755284E−04 | 6.2478139E−03 | −9.8549438E−03 | −2.5590095E−03 |
| 11 | 1.0000000E+00 | −7.8043644E−02 | 6.2606467E−02 | −1.1125546E−02 | −9.1793373E−03 |
| 12 | 1.0000000E+00 | −9.6258160E−02 | 4.8276967E−02 | −2.2144093E−02 | −4.1619718E−03 |

TABLE 4-continued

Example 2: Aspherical Surface Data

|    | | | | |
|----|---------------|----------------|----------------|----------------|----------------|
| 13 | 1.9629975E+00 | −7.1328775E−02 | 5.7603016E−02  | −3.4996691E−02 | 5.3854754E−04  |
| 14 | 4.5909177E+00 | −4.6308333E−02 | −7.7893305E−02 | 5.0908432E−02  | −5.3816421E−03 |
| 15 | −5.7538716E+00| −9.4299162E−03 | −5.8837733E−02 | 3.9262387E−02  | −7.5515414E−03 |

|    | A7 | A8 | A9 | A10 |
|----|----|----|----|-----|
| 1  | −3.4972674E−02 | 2.1715579E−02  | −6.4650587E−03 | 4.1349079E−04  |
| 2  | 6.6805172E−02  | −5.4897905E−02 | 2.3161561E−02  | −4.0767414E−03 |
| 4  | 5.3486046E−02  | −6.3020997E−02 | 2.9672448E−02  | −5.1550744E−03 |
| 5  | 2.6701993E−01  | −1.8296623E−01 | 6.4772061E−02  | −9.3178906E−03 |
| 6  | 4.2828370E−02  | −2.7798293E−02 | 1.2614073E−02  | −3.1239376E−03 |
| 7  | −4.6606386E−01 | 2.6407846E−01  | −7.8128762E−02 | 9.0855815E−03  |
| 8  | −7.7639855E−02 | 1.7398169E−03  | 9.5815443E−03  | −1.6456323E−03 |
| 9  | −7.0582105E−02 | 2.0789982E−02  | −2.8452448E−03 | 3.7588836E−04  |
| 10 | 4.8991048E−03  | −1.6478233E−03 | −2.0497499E−04 | 1.2893921E−04  |
| 11 | 6.4372766E−03  | −6.3624382E−04 | −3.1469623E−04 | 6.0785443E−05  |
| 12 | 3.3119934E−03  | −2.5653499E−04 | −6.7470551E−05 | 1.1917363E−05  |
| 13 | 3.7858664E−03  | −4.8861665E−04 | −1.1455010E−04 | 1.9315606E−05  |
| 14 | −2.8444092E−03 | 9.0245719E−04  | −9.1661966E−05 | 2.6800262E−06  |
| 15 | −1.0009668E−03 | 5.8774573E−04  | −8.0558007E−05 | 3.7715606E−06  |

TABLE 5

Example 3
f = 7.126, Bf = 2.068

| Si | Ri | Di | Ndj | vdj |
|----|----|----|-----|-----|
| *1 | 3.91232 | 0.794 | 1.68930 | 53.08 |
| *2 | 9.89903 | 0.050 | | |
| 3 (aperture stop) | ∞ | 0.150 | | |
| *4 | 21.23586 | 0.623 | 1.63351 | 23.63 |
| *5 | 8.62192 | 0.238 | | |
| *6 | 53.07830 | 0.565 | 1.54492 | 55.89 |
| *7 | −12.76496 | 0.158 | | |
| *8 | 13.70121 | 0.623 | 1.63351 | 23.63 |
| *9 | 12.87909 | 0.790 | | |
| *10 | −2.90189 | 1.370 | 1.54492 | 55.89 |
| *11 | −1.72231 | 0.150 | | |
| *12 | 4.94212 | 0.810 | 1.63351 | 23.63 |
| *13 | 2.47494 | 0.539 | | |
| *14 | 23.83331 | 0.691 | 1.54492 | 55.89 |
| *15 | 5.96949 | 0.762 | | |
| 16 | ∞ | 0.250 | 1.51633 | 64.14 |
| 17 | ∞ | 1.141 | | |
| 18 (imaging surface) | ∞ | | | |

*aspherical surface

TABLE 6

Example 3: Aspherical Surface Data

| Surface Number | KA | A3 | A4 | A5 | A6 |
|----|----|----|----|----|----|
| 1  | −2.5466241E+00 | −6.9254467E−04 | 8.6242045E−03  | −1.0193799E−02 | 1.4661297E−02  |
| 2  | −3.5953646E+00 | 8.8507891E−04  | −2.1073227E−02 | 8.8721533E−03  | −1.4937749E−02 |
| 4  | −2.0080180E+01 | 9.3702688E−05  | −3.1546875E−02 | 9.3420621E−03  | −1.5716417E−02 |
| 5  | −1.6859684E+01 | 2.1106329E−03  | −3.1837691E−02 | 3.3909275E−02  | −6.1609137E−02 |
| 6  | 1.1649951E+00  | 1.0899523E−03  | −1.1522019E−02 | 1.9027739E−02  | −3.2429194E−02 |
| 7  | 2.6395787E+01  | −2.6411626E−03 | −3.0425772E−02 | −5.3756394E−02 | 1.3824126E−01  |
| 8  | 3.6301379E+01  | −2.2344844E−03 | −7.8771800E−02 | −1.6190427E−02 | 4.9915645E−02  |
| 9  | 1.6081945E+01  | −2.5962135E−03 | −2.7957055E−02 | −2.2440008E−02 | 2.7055945E−02  |
| 10 | −7.6345529E−01 | −1.5349933E−03 | 5.6786581E−03  | −7.6568677E−03 | −3.3597322E−03 |
| 11 | 2.8793318E−01  | −1.0971488E−03 | 4.2116401E−02  | −2.2284157E−02 | 3.1392298E−04  |
| 12 | 1.3252638E+00  | 2.3273834E−03  | −3.0642071E−02 | −1.3388347E−03 | 4.6885906E−03  |
| 13 | −6.7460766E+00 | −3.5559466E−03 | −1.8520034E−02 | 3.9679505E−03  | 9.8597060E−04  |
| 14 | 1.2163600E+01  | 4.3037193E−03  | −4.4550651E−02 | 2.1675867E−03  | −2.0299765E−03 |
| 15 | −2.5723017E+01 | 3.5315106E−03  | −2.5394332E−02 | 1.2960885E−03  | −2.1155179E−03 |

|    | A7 | A8 | A9 | A10 |
|----|----|----|----|-----|
| 1  | −1.3103615E−02 | 5.2845448E−03  | −5.8283721E−04 | −2.2140701E−04 |
| 2  | 1.6887794E−02  | −1.1431342E−02 | 4.4059443E−03  | −7.8791592E−04 |
| 4  | 2.1154896E−02  | −9.7034855E−03 | 2.3027658E−03  | −3.6255069E−04 |
| 5  | 6.4192957E−02  | −3.9595844E−02 | 1.5168355E−02  | −2.8529533E−03 |
| 6  | 1.3262591E−02  | −3.4490645E−03 | 9.2809128E−04  | −7.5202552E−05 |
| 7  | −1.3232453E−01 | 5.9775599E−02  | −1.3413380E−02 | 1.4420466E−03  |
| 8  | −2.8353965E−02 | 6.4379267E−04  | 2.5911843E−03  | −2.1908622E−04 |
| 9  | −1.3540269E−02 | 4.5782233E−03  | −1.1617614E−03 | 2.0493591E−04  |
| 10 | 1.2712526E−03  | 7.7685406E−04  | −6.0206673E−06 | −6.5019129E−05 |
| 11 | 3.4846345E−03  | −8.5071235E−04 | −7.0558497E−05 | 5.0571581E−05  |

TABLE 6-continued

Example 3: Aspherical Surface Data

| | | | | |
|---|---|---|---|---|
| 12 | −6.6869582E−04 | −3.1218258E−04 | 4.6930977E−05 | 5.4013330E−06 |
| 13 | −5.4234136E−04 | 3.1102388E−05 | 1.5759526E−05 | −1.9749194E−06 |
| 14 | −8.4762822E−04 | 2.1508676E−04 | −1.4375344E−05 | 2.5356677E−08 |
| 15 | −1.7749649E−04 | 1.0728771E−04 | −1.4591377E−05 | 7.2658843E−07 |

TABLE 7

Example 4
f = 6.162, Bf = 1.758

| Si | Ri | Di | Ndj | νdj |
|---|---|---|---|---|
| *1 | 4.48632 | 0.750 | 1.68930 | 53.08 |
| *2 | 10.80971 | 0.127 | | |
| 3 (aperture stop) | ∞ | 0.150 | | |
| *4 | 35.17514 | 0.624 | 1.63351 | 23.63 |
| *5 | 10.37528 | 0.150 | | |
| *6 | 20.04085 | 0.757 | 1.54492 | 55.89 |
| *7 | −9.63855 | 0.203 | | |
| *8 | 18.63615 | 0.623 | 1.63351 | 23.63 |
| *9 | 11.89701 | 0.539 | | |
| *10 | −3.73217 | 1.843 | 1.54492 | 55.89 |
| *11 | −2.07798 | 0.150 | | |
| *12 | 3.20325 | 0.810 | 1.63351 | 23.63 |
| *13 | 1.85774 | 0.501 | | |
| *14 | 2.47691 | 0.685 | 1.54492 | 55.89 |
| *15 | 2.08567 | 0.900 | | |
| 16 | ∞ | 0.250 | 1.51633 | 64.14 |
| 17 | ∞ | 0.693 | | |
| 18 (imaging surface) | ∞ | | | |

*aspherical surface

TABLE 9

Example 5
f = 6.544, Bf = 1.211

| Si | Ri | Di | Ndj | νdj |
|---|---|---|---|---|
| *1 | 3.55154 | 1.042 | 1.68930 | 53.08 |
| *2 | 10.63988 | 0.150 | | |
| *3 | 10.28711 | 0.550 | 1.99754 | 20.51 |
| *4 | 7.09317 | 0.226 | | |
| 5 (aperture stop) | ∞ | 0.261 | | |
| *6 | 61.89348 | 0.702 | 1.54492 | 55.89 |
| *7 | −28.00523 | 0.302 | | |
| *8 | −26.55328 | 0.503 | 1.63351 | 23.63 |
| *9 | −684.12145 | 0.657 | | |
| *10 | 25.36826 | 1.351 | 1.54492 | 55.89 |
| *11 | −3.74501 | 0.150 | | |
| *12 | 11.10144 | 0.500 | 1.63351 | 23.63 |
| *13 | 12.17088 | 0.481 | | |
| *14 | 18.31268 | 0.507 | 1.54492 | 55.89 |
| *15 | 2.07673 | 0.612 | | |
| 16 | ∞ | 0.250 | 1.51633 | 64.14 |
| 17 | ∞ | 0.434 | | |
| 18 (imaging surface) | ∞ | | | |

*aspherical surface

TABLE 8

Example 4: Aspherical Surface Data

| Surface Number | KA | A3 | A4 | A5 | A6 |
|---|---|---|---|---|---|
| 1 | −7.9144537E+00 | −7.8830916E−04 | 1.3200254E−02 | −8.8584474E−03 | 1.0566888E−02 |
| 2 | −2.3377575E+01 | 1.3410326E−04 | −1.0437511E−02 | 4.5930375E−03 | −1.1647704E−02 |
| 4 | −4.9999830E+01 | −4.7310627E−04 | −1.9966188E−02 | −7.4149894E−04 | −4.1888731E−04 |
| 5 | −5.0000000E+01 | 1.0284664E−03 | −2.4184716E−02 | 1.7091880E−02 | −4.1233687E−02 |
| 6 | −5.0000000E+01 | −4.2885214E−04 | −1.2114095E−02 | 5.6415341E−03 | −2.2434555E−02 |
| 7 | −9.3256029E+00 | −1.6687338E−03 | −1.7417148E−02 | −6.6562134E−02 | 1.2170772E−01 |
| 8 | 8.3471769E+00 | −3.8225797E−03 | −4.3205722E−02 | −4.3357555E−02 | 4.7095847E−02 |
| 9 | 1.3550829E+01 | −1.8592976E−04 | −1.9951286E−02 | −2.1962129E−02 | 2.1624267E−02 |
| 10 | −1.0262879E+00 | −8.9855450E−05 | 4.4288160E−03 | −1.2419787E−02 | 1.8627009E−03 |
| 11 | 3.6493642E−01 | −6.6388659E−02 | 7.7861326E−02 | −2.7114852E−02 | −3.7615993E−03 |
| 12 | 4.3918988E−01 | −6.1694824E−02 | 5.2997444E−03 | −1.0266072E−03 | 5.3972329E−04 |
| 13 | −3.8106062E+00 | −2.5334079E−02 | 9.6406897E−03 | −3.0928994E−03 | 4.7552897E−04 |
| 14 | −2.6661692E−01 | −5.4923231E−03 | −5.4734481E−02 | 2.1226037E−02 | −1.3285021E−03 |
| 15 | −2.3097169E+00 | 4.1612874E−03 | −3.3017451E−02 | 1.4287908E−02 | −1.9796139E−03 |

| | A7 | A8 | A9 | A10 |
|---|---|---|---|---|
| 1 | −1.0979505E−02 | 5.1924039E−03 | −9.5030906E−04 | −5.8726564E−05 |
| 2 | 1.5575236E−02 | −1.1795601E−02 | 4.4758202E−03 | −7.0890306E−04 |
| 4 | 9.8492134E−03 | −1.0518998E−02 | 5.7121053E−03 | −1.3732643E−03 |
| 5 | 5.3004726E−02 | −4.1930236E−02 | 1.8796389E−02 | −3.5729859E−03 |
| 6 | 1.5366576E−02 | −7.8105174E−03 | 1.5052602E−03 | 6.0291071E−05 |
| 7 | −1.1651298E−01 | 5.8811831E−02 | −1.6093325E−02 | 1.9164681E−03 |
| 8 | −2.1585069E−02 | −1.2527834E−03 | 1.9620398E−03 | 1.0974531E−05 |
| 9 | −1.2805979E−02 | 5.4917569E−03 | −1.3043391E−03 | 1.3942379E−04 |
| 10 | 1.1664584E−03 | −1.0317140E−04 | 5.3041432E−05 | −2.2849549E−05 |
| 11 | 5.1534452E−03 | −9.4443458E−04 | −1.6485034E−04 | 6.3981725E−05 |
| 12 | −7.1362655E−05 | −6.9164061E−05 | 1.7181845E−05 | −8.3968329E−07 |
| 13 | 1.5055369E−05 | −2.3675791E−05 | 3.6223194E−06 | −1.2451413E−07 |
| 14 | −8.3445990E−04 | 1.9608613E−04 | −1.4361497E−05 | 2.1282876E−07 |
| 15 | −2.2893345E−04 | 1.1160781E−04 | −1.3970917E−05 | 6.2887532E−07 |

TABLE 10

Example 5: Aspherical Surface Data

| Surface Number | KA | A3 | A4 | A5 | A6 |
|---|---|---|---|---|---|
| 1 | −4.8929545E+00 | −1.9779288E−03 | 2.7754944E−02 | −2.5320873E−02 | 3.6041594E−02 |
| 2 | 1.4220235E+01 | 4.1989210E−03 | −3.9079017E−02 | 5.7159667E−02 | −7.8280277E−02 |
| 3 | −8.0059411E+00 | 1.2475174E−02 | −3.3581149E−02 | 2.4688471E−02 | −4.5835441E−02 |
| 4 | −3.0609018E−01 | 1.6483011E−02 | −9.7790208E−02 | 1.9197315E−01 | −2.8814870E−01 |
| 6 | 5.0000009E+01 | 2.2238869E−03 | −3.6465297E−02 | 3.4922827E−02 | −4.4531226E−02 |
| 7 | −4.6758247E+01 | −2.3583787E−02 | 7.4483460E−02 | −2.9002359E−01 | 4.6538843E−01 |
| 8 | 4.4566282E+01 | −7.3040338E−03 | −3.8645051E−02 | −3.7699498E−02 | 4.8514479E−02 |
| 9 | −4.9987306E+01 | −1.0377317E−02 | −1.2085943E−02 | −5.9252811E−02 | 7.8005469E−02 |
| 10 | 4.2012915E+01 | 5.7735437E−03 | −2.0884749E−02 | 1.9020572E−02 | −1.1029350E−02 |
| 11 | 1.0000000E+00 | −4.1737169E−02 | 2.3117361E−02 | 1.0047878E−02 | −3.7170456E−03 |
| 12 | 1.0000000E+00 | −4.3477431E−02 | 2.3879775E−03 | 3.6120356E−03 | −4.4853463E−04 |
| 13 | −1.6480154E+01 | −9.4032043E−03 | 3.9020550E−04 | −5.6578683E−03 | −1.2826969E−04 |
| 14 | 2.3394074E−01 | −7.6385764E−04 | −1.0452077E−01 | 5.1695450E−02 | −3.9495533E−03 |
| 15 | −5.1235601E+00 | −3.5026411E−03 | −5.6434532E−02 | 3.4059063E−02 | −6.3580544E−03 |

| | A7 | A8 | A9 | A10 |
|---|---|---|---|---|
| 1 | −3.5172178E−02 | 2.0271700E−02 | −6.2486735E−03 | 8.2335933E−04 |
| 2 | 8.3873762E−02 | −5.2038611E−02 | 1.6742647E−02 | −2.1996115E−03 |
| 3 | 7.6973339E−02 | −5.9710465E−02 | 2.1610120E−02 | −2.9923859E−03 |
| 4 | 2.8063765E−01 | −1.5976969E−01 | 4.7570948E−02 | −5.4600068E−03 |
| 6 | 2.9196084E−02 | −9.2599842E−03 | 1.3459887E−03 | −2.3696840E−04 |
| 7 | −4.5011094E−01 | 2.5536899E−01 | −7.8352272E−02 | 9.9176061E−03 |
| 8 | −2.7943934E−02 | 4.2950971E−03 | 1.1946306E−03 | 1.2382229E−04 |
| 9 | −5.7820137E−02 | 2.5770135E−02 | −6.2776586E−03 | 7.8272755E−04 |
| 10 | 2.3061000E−03 | −8.0750687E−04 | 4.1189904E−04 | −7.8887098E−05 |
| 11 | −2.1682980E−03 | 4.3205320E−04 | 1.5596265E−04 | −2.7975659E−05 |
| 12 | −2.2383952E−03 | 4.2997356E−04 | 1.2281390E−04 | −2.3905180E−05 |
| 13 | 6.6355671E−04 | −8.4009368E−05 | −1.2694089E−05 | 2.7958786E−06 |
| 14 | −2.9509401E−03 | 8.7795355E−04 | −9.1739962E−05 | 3.1211266E−06 |
| 15 | −8.1588132E−04 | 5.3352732E−04 | −8.5563671E−05 | 4.9363007E−06 |

TABLE 11

Example 6
f = 6.746, Bf = 1.192

| Si | Ri | Di | Ndj | νdj |
|---|---|---|---|---|
| *1 | 3.45989 | 1.031 | 1.68930 | 53.08 |
| *2 | 11.09136 | 0.150 | | |
| *3 | 11.47051 | 0.500 | 1.63351 | 23.63 |
| *4 | 5.79049 | 0.219 | | |
| 5 (aperture stop) | ∞ | 0.185 | | |
| *6 | 115.37069 | 0.890 | 1.54492 | 55.89 |
| *7 | −13.40788 | 0.323 | | |
| *8 | −11.20166 | 0.702 | 1.63351 | 23.63 |
| *9 | −135.08261 | 0.383 | | |
| *10 | 51.32833 | 1.690 | 1.54492 | 55.89 |
| *11 | −3.70074 | 0.150 | | |
| *12 | 8.08484 | 0.564 | 1.63351 | 23.63 |
| *13 | 7.24874 | 0.485 | | |
| *14 | 8.77574 | 0.703 | 1.54492 | 55.89 |
| *15 | 2.12825 | 0.612 | | |
| 16 | ∞ | 0.250 | 1.51633 | 64.14 |
| 17 | ∞ | 0.415 | | |
| 18 (imaging surface) | ∞ | | | |

*aspherical surface

TABLE 12

Example 6: Aspherical Surface Data

| Surface Number | KA | A3 | A4 | A5 | A6 |
|---|---|---|---|---|---|
| 1 | −4.8368401E+00 | −2.1014077E−03 | 2.9342275E−02 | −2.5803454E−02 | 3.6404014E−02 |
| 2 | 1.9080220E+01 | 4.6292000E−03 | −3.6339211E−02 | 5.7048489E−02 | −7.9403184E−02 |
| 3 | 1.0942141E+00 | 1.9967261E−03 | −4.2763279E−02 | 2.9031607E−02 | −4.3135174E−02 |
| 4 | −4.0808003E+00 | 1.7506146E−02 | −1.0459030E−01 | 1.9890592E−01 | −2.8843756E−01 |
| 6 | −4.9822312E+01 | 2.7718838E−03 | −3.7901553E−02 | 3.5448620E−02 | −4.3502842E−02 |
| 7 | 4.2691040E+01 | −1.7023759E−02 | 7.4513500E−02 | −2.8847255E−01 | 4.6394811E−01 |
| 8 | −7.0747223E+00 | −6.1105350E−03 | −1.3762225E−02 | −4.7399145E−02 | 4.8129992E−02 |
| 9 | −3.4608394E+01 | −7.8350502E−03 | 5.2043951E−03 | −5.9435497E−02 | 7.6297012E−02 |
| 10 | −4.9066254E+01 | 7.9401532E−03 | −2.1615024E−02 | 2.2331451E−02 | −1.0692988E−02 |
| 11 | 1.0000000E+00 | −2.0903089E−02 | −4.7034744E−03 | 1.7032423E−02 | −1.6025573E−03 |
| 12 | 1.0000000E+00 | −3.1130882E−02 | −9.0163515E−03 | 6.4071590E−03 | 3.2529212E−04 |
| 13 | 1.8259306E+00 | −2.1243312E−02 | 4.0208003E−03 | −6.5226056E−03 | −3.8415136E−05 |
| 14 | 7.1268333E−02 | 2.8048318E−03 | −1.0561402E−01 | 5.1563721E−02 | −3.9458470E−03 |

TABLE 12-continued

Example 6: Aspherical Surface Data

| 15 | −4.4420862E+00 | 3.4889217E−03 | −5.8913786E−02 | 3.4421053E−02 | −6.2756886E−03 |

| | A7 | A8 | A9 | A10 |
|---|---|---|---|---|
| 1 | −3.5332599E−02 | 2.0231103E−02 | −6.2023212E−03 | 8.1468239E−04 |
| 2 | 8.3234128E−02 | −5.1754612E−02 | 1.7056043E−02 | −2.3149815E−03 |
| 3 | 7.5128106E−02 | −6.0056054E−02 | 2.2349847E−02 | −3.2068318E−03 |
| 4 | 2.7914485E−01 | −1.5950470E−01 | 4.8331868E−02 | −5.8321353E−03 |
| 6 | 2.8811240E−02 | −9.7420720E−03 | 1.2993289E−03 | −7.1518814E−05 |
| 7 | −4.5065901E−01 | 2.5520756E−01 | −7.7840615E−02 | 9.9282514E−03 |
| 8 | −2.6596096E−02 | 4.2769923E−03 | 1.1632255E−03 | −8.4867877E−05 |
| 9 | −5.8243399E−02 | 2.5862672E−02 | −6.2628825E−03 | 7.0296433E−04 |
| 10 | 2.3226596E−03 | −8.0673769E−04 | 3.8151208E−04 | −6.0953368E−05 |
| 11 | −1.8925385E−03 | 2.8011794E−04 | 1.2211470E−04 | −2.4511306E−05 |
| 12 | −2.1300803E−03 | 3.3198161E−04 | 1.3030573E−04 | −2.6320329E−05 |
| 13 | 6.9467044E−04 | −7.8486154E−05 | −1.3849288E−05 | 2.1973327E−06 |
| 14 | −2.9467692E−03 | 8.7894252E−04 | −9.1646283E−05 | 3.0636557E−06 |
| 15 | −8.1413176E−04 | 5.3072855E−04 | −8.5992598E−05 | 5.0308194E−06 |

TABLE 13

Values Related to Conditional Formulae

| Conditional Formula | Expression | Example 1 | Example 2 | Example 3 | Example 4 | Example 5 | Example 6 |
|---|---|---|---|---|---|---|---|
| 1 | f/f12 | 0.64 | 0.57 | 0.55 | 0.36 | 0.71 | 0.65 |
| 2 | f/f2 | −0.37 | −0.60 | −0.30 | −0.26 | −0.26 | −0.55 |
| 3 | f/f1 | 0.90 | 1.06 | 0.80 | 0.58 | 0.90 | 1.10 |
| 4 | f/f3 | 0.41 | 0.43 | 0.38 | 0.51 | 0.18 | 0.40 |
| 5 | f/f4 | −0.55 | −0.48 | −0.01 | −0.11 | −0.15 | −0.34 |
| 6 | Da/f | 0.16 | 0.13 | 0.11 | 0.12 | 0.16 | 0.15 |
| 7 | Db/f | 0.07 | 0.08 | 0.09 | 0.10 | 0.08 | 0.07 |
| 8 | Dc/f | 0.27 | 0.26 | 0.23 | 0.27 | 0.27 | 0.25 |

What is claimed is:

1. An imaging lens substantially consisting of seven lenses, including, ordered as follows from an object side:
   a first lens having a positive refractive power and a convex surface toward the object side;
   a second lens having a negative refractive power;
   a third lens having a positive refractive;
   a fourth lens;
   a fifth lens having a positive refractive power;
   a sixth lens; and
   a seventh lens having a negative refractive power, a concave surface toward an image side, and at least one inflection point on the surface toward the image side,
   all of the first through seventh lenses being single lenses.

2. The imaging lens as defined in claim 1, wherein the following conditional formula is satisfied:

$$0<f/f12 \tag{1}$$

wherein f is the focal length of the entire system, and f12 is the combined focal length of the first lens and the second lens.

3. The imaging lens as defined in claim 1, wherein the following conditional formula is satisfied:

$$f/f2<-0.1 \tag{2}$$

wherein f is the focal length of the entire system, and f2 is the focal length of the second lens.

4. The imaging lens as defined in claim 1, wherein the following conditional formula is satisfied:

$$0<f/f1<2.5 \tag{3}$$

wherein f is the focal length of the entire system, and f1 is the focal length of the first lens.

5. The imaging lens as defined in claim 1, wherein the following conditional formula is satisfied:

$$0<f/f3 \tag{4}$$

wherein f is the focal length of the entire system, and f3 is the focal length of the third lens.

6. The imaging lens as defined in claim 1, wherein the following conditional formula is satisfied:

$$f/f4<0 \tag{5}$$

wherein f is the focal length of the entire system, and f4 is the focal length of the fourth lens.

7. The imaging lens as defined in claim 1, wherein the following conditional formula is satisfied:

$$0.08<Da/f \tag{6}$$

wherein f is the focal length of the entire system, and Da is the thickness of the first lens along the optical axis.

8. The imaging lens as defined in claim 1, wherein the following conditional formula is satisfied:

$$0.05<Db/f<0.3 \tag{7}$$

wherein f is the focal length of the entire system, and Db is the thickness of the second lens along the optical axis.

9. The imaging lens as defined in claim 1, wherein the following conditional formula is satisfied:

$$0.2<Dc/f<0.5 \tag{8}$$

wherein f is the focal length of the entire system, and Dc is the distance from the surface of the first lens toward the object side to the surface of the second lens toward the image side along the optical axis.

10. The imaging lens as defined in claim 1, further comprising:
an aperture stop, provided between the first lens and the second lens or between the second lens and the third lens.

11. The imaging lens as defined in claim 2, wherein the following conditional formula is satisfied:

$$0 < f/f12 < 5 \qquad (1\text{-}1)$$

wherein f is the focal length of the entire system, and f12 is the combined focal length of the first lens and the second lens.

12. The imaging lens as defined in claim 3, wherein the following conditional formula is satisfied:

$$-1 < f/f2 < -0.2 \qquad (2\text{-}1)$$

wherein f is the focal length of the entire system, and f2 is the focal length of the second lens.

13. The imaging lens as defined in claim 4, wherein the following conditional formula is satisfied:

$$0.5 < f/f1 < 2 \qquad (3\text{-}1)$$

wherein f is the focal length of the entire system, and f1 is the focal length of the first lens.

14. The imaging lens as defined in claim 5, wherein the following conditional formula is satisfied:

$$0.32 < f/f3 < 1 \qquad (4\text{-}1)$$

wherein f is the focal length of the entire system, and f3 is the focal length of the third lens.

15. The imaging lens as defined in claim 6, wherein the following conditional formula is satisfied:

$$-0.65 < f/f4 < 0 \qquad (5\text{-}1)$$

wherein f is the focal length of the entire system, and f4 is the focal length of the fourth lens.

16. The imaging lens as defined in claim 7, wherein the following conditional formula is satisfied:

$$0.1 < Da/f < 0.3 \qquad (6\text{-}1)$$

wherein f is the focal length of the entire system, and Da is the thickness of the first lens along the optical axis.

17. The imaging lens as defined in claim 8, wherein the following conditional formula is satisfied:

$$0.06 < Db/f < 0.2 \qquad (7\text{-}1)$$

wherein f is the focal length of the entire system, and Db is the thickness of the second lens along the optical axis.

18. The imaging lens as defined in claim 9, wherein the following conditional formula is satisfied:

$$0.21 < Dc/f < 0.4 \qquad (8\text{-}1)$$

wherein f is the focal length of the entire system, and Dc is the distance from the surface of the first lens toward the object side to the surface of the second lens toward the image side along the optical axis.

19. The imaging lens as defined in claim 11, wherein the following conditional formula is satisfied:

$$0.2 < f/f12 < 1 \qquad (1\text{-}2)$$

wherein f is the focal length of the entire system, and f12 is the combined focal length of the first lens and the second lens.

20. An imaging apparatus, comprising the imaging lens defined in claim 1.

* * * * *